(12) United States Patent
Witmer

(10) Patent No.: US 7,912,879 B2
(45) Date of Patent: Mar. 22, 2011

(54) METHOD FOR APPLYING CLOTHOID CURVE VALUES TO ROADWAYS IN A GEOGRAPHIC DATA INFORMATION SYSTEM

(75) Inventor: James Alan Witmer, Lebanon, NH (US)

(73) Assignee: TeleAtlas North America Inc, Lebanon, NH (US)

( * ) Notice: Subject to any disclaimer, the term of this patent is extended or adjusted under 35 U.S.C. 154(b) by 371 days.

(21) Appl. No.: 12/032,538

(22) Filed: Feb. 15, 2008

(65) Prior Publication Data
US 2009/0144331 A1 Jun. 4, 2009

Related U.S. Application Data

(60) Provisional application No. 60/992,251, filed on Dec. 4, 2007.

(51) Int. Cl.
G06F 17/30 (2006.01)
(52) U.S. Cl. ........................................ 707/831
(58) Field of Classification Search ............... 707/831; 703/2
See application file for complete search history.

(56) References Cited

U.S. PATENT DOCUMENTS

| | | | |
|---|---|---|---|
| 6,681,177 B2 | 1/2004 | Joshi | |
| 6,732,046 B1 | 5/2004 | Joshi | |
| 7,152,022 B1 | 12/2006 | Joshi | |
| 7,324,895 B2 | 1/2008 | Nagel | |
| 2005/0187705 A1* | 8/2005 | Niwa et al. | 701/208 |
| 2006/0155464 A1* | 7/2006 | Smartt | 701/208 |
| 2007/0288158 A1 | 12/2007 | Dorum | |

OTHER PUBLICATIONS

<Author unknown> Ohio State University, "Shape Representation and Description," http://sampl.ece.ohio-state.edu/EE863/2004/ECE863-O-ShapeFourier.ppt.
Li, Z., et al., "Smoothing an arc spline," Computers and Graphics vol. 29 (2005), pp. 576-587. http://www.math.zju.edu.cn/cagd/Seminar/2006_SpringSummer/2006_Spring_Master_LYQ_ref.pdf.

* cited by examiner

*Primary Examiner* — Pierre M Vital
*Assistant Examiner* — Truong V Vo
(74) *Attorney, Agent, or Firm* — Jacob Eisenberg

(57) ABSTRACT

Embodiments of the invention are methods for applying clothoid curve values to roadways in a geographic data information system. One embodiment is a method, comprising: selecting database segments in the geographic data information system, wherein the database segments describe roadways; determining segment chains from the selected database segments; preparing the segment chains for transition to curvature space; transitioning to a curvature function in the curvature space, by computing heading change at points along the segment chain, resulting in a transformation of the segment chains into clothoids; smoothing the curvature function; fitting the smoothed curvature function with a more generalized form which remains within a selected tolerance of the smoothed curvature function; and storing identified segments of straight lines, transition zones, and segments of constant curvature in the geographic data information system.

11 Claims, 31 Drawing Sheets

For each chain ...

- preparing segment chains for transition to curvature space;
- transitioning to a curvature function in the curvature space, by computing heading change at points along the segment chain, resulting in a transformation of the segment chains into clothoids;
- smoothing the curvature function;
- fitting the smoothed curvature function with a more generalized form which remains within a selected tolerance of the smoothed curvature function; and
- storing identified segments of straight lines, transition zones, and segments of constant curvature in the geographic data information system.

110

For each chain ...

- preparing segment chains for transition to curvature space;
- transitioning to a curvature function in the curvature space, by computing heading change at points along the segment chain, resulting in a transformation of the segment chains into clothoids;
- smoothing the curvature function;
- fitting the smoothed curvature function with a more generalized form which remains within a selected tolerance of the smoothed curvature function; and
- storing identified segments of straight lines, transition zones, and segments of constant curvature in the geographic data information system.

```
1.  // use the standard least-squares model
2.  // we must integrate over the piecewise referenced function to arrive at values for
3.  // sum(x), sum(y), sum(1) (the count or length in x), sum(xy), and sum(x-squared) -
4.  // called sumx2.
5.  // Plug those summed values into a standard slope-intercept formula for least-squares.
6.  SlopeIntercept LinearReference::least_squares_fit() const
7.  {
8.      iterator item   = begin(),
9.               next   = item;
10.     double   xbegin = front().first,
11.              xend   = back().first;
12.     double   sumx   = (xend*xend - xbegin*xbegin)/2.0,
13.              sumy   = 0,
14.              sumx2  = (xend*xend*xend - xbegin*xbegin*xbegin)/3.0,
15.              sumxy  = 0;
16.     double   count  = xend - xbegin;
```

FIG. 23A

```
1.   // this loop iterates over each linear piece of the piecewise function
2.   for(++next; next != end(); ++item, ++next)
3.   {
4.       double x1 = item->first;
5.       double x2 = next->first;
6.       double weight = x2-x1;
7.       double y_average = (item->second + next->second)/2.0;
8.       // fill variables.
9.       sumy += weight * y_average;
10.      // sum(x*y) integration needs the slope-intercept form
11.      SlopeIntercept si(*item, *next);
12.      // from the integral of xy where y = mx+b:
13.      sumxy +=
14.                  si.slope()*(x2*x2*x2 - x1*x1*x1)/3.0
15.                + si.intercept() * (x2*x2 - x1*x1) / 2.0;
16.  }
17.  double denominator = count*sumx2 - sumx*sumx;
18.  double slope = (count*sumxy - sumx*sumy) / denominator;
19.  double intercept = (sumx2*sumy - sumx*sumxy) / denominator;
20.  return SlopeIntercept(slope, intercept);
21. }
```

FIG. 23B $$W = \frac{1}{\sigma\sqrt{2\pi}} e^{\frac{1}{2}(x/\sigma)^2}, \quad V = mx+b$$

$$2400 \quad \int \frac{1}{\sigma\sqrt{2\pi}} e^{\frac{1}{2}(x/\sigma)^2} (mx+b)\, dx$$

FIG. 24

$$\sum_{\substack{section(p_x+n\sigma) \\ s = section(p_x-n\sigma)}} \begin{aligned} c' &= c(q(s_{begin}),\, q(s_{end})), \\ w' &= w(q(s_{begin}),\, q(s_{end})), \end{aligned} \quad w'\left(\left(1-c'\right)v_{begin} + c'\,v_{end}\right)$$

FIG. 25

METHOD FOR APPLYING CLOTHOID CURVE VALUES TO ROADWAYS IN A GEOGRAPHIC DATA INFORMATION SYSTEM

CLAIM OF PRIORITY

The present application claims priority to U.S. Provisional Application No. 60/992,251 entitled "SYSTEM AND METHOD FOR APPLYING CLOTHOID CURVE VALUES TO ROADWAYS IN A GEOGRAPHIC DATA INFORMATION SYSTEM," by James Alan Witmer, filed Dec. 4, 2007, which application is incorporated herein by reference.

CROSS-REFERENCE TO RELATED APPLICATIONS

The following co-pending U.S. patent applications are assigned to the assignee of the present application, and their disclosures are incorporated herein by reference:

U.S. patent application Ser. No. 12/032,540 entitled "COMPUTER READABLE STORAGE MEDIUM STORING INSTRUCTIONS FOR APPLYING CLOTHOID CURVE VALUES TO ROADWAYS IN A GEOGRAPHIC DATA INFORMATION SYSTEM" by James Alan Witmer, filed Feb. 15, 2008; and U.S. patent application Ser. No. 12/032,545 entitled "SYSTEM FOR APPLYING CLOTHOID CURVE VALUES TO ROADWAYS IN A GEOGRAPHIC DATA INFORMATION SYSTEM" by James Alan Witmer, filed Feb. 15, 2008.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to digital map databases and systems that use such digital map databases, including Geographic Information Systems (GIS), Navigation Systems (embedded, PDA, wireless), Internet applications, etc., and particularly to the representation of curvature information along linear features in such systems

BACKGROUND OF THE INVENTION

A vast majority of GIS digital maps represent straight linear features—streets, water, political, land use, or recreational boundaries—as chained line segments connected by mutual endpoints often referred to as shape points. These points represent a point in 2-space or 3-space deemed to be along the path of the line of travel, service, or boundary. These shape points are usually inflections or bends along a single path, such that when two line edges meet at any shape point they are generally not collinear. The clear intention of such lines is representing the real-world feature to a reasonably good approximation in a reasonably simple and compact form. Travel along the actual real-world path or boundary can be approximately represented by traversing each successive line segment.

The shaped line format described is a simplified model of real-world paths; its primary strength is its simplicity. It is easy to draw on a raster screen, and it readily allows computations for length, distance, and other geometric queries. However, since actual linear features are much more complex and composed of non-line segment components, representation by shaped lines is plagued with representation error. Any attempt to reduce this representation error requires an increase in the density of the data; no finite amount of data stored in a line segment format can perfectly represent a non-line segment shape.

The Clothoid is a two-dimensional shape or path, defined to have constant change in curvature over the travel distance. As classically illustrated, the clothoid looks like a clock spring, with zero curvature at one end, and then coiling ever tighter at the other end. Arcs and line segments are simply special cases of the clothoid. A circular arc is a clothoid because it has a constant curvature—that is, zero curvature change—wherein the curvature magnitude is inversely related to that circle's radius. A straight line is also a clothoid, having both a no-curvature change, and a constant curvature of zero over its entire length.

Clothoids and their special cases, circular arcs and straight lines, are used in much real-world construction. Roads in particular are often constructed from pieced segments consisting of straight lines, circular arcs, and clothoids. Roadbed designers recognize that roadway curvature directly relates to movement of steering wheels and axle components of vehicles traversing the roadway. For them, limiting any abrupt changes in curvature by choosing clothoid design where feasible, represents a decision that maximizes vehicular safety and comfort, and minimizes wear on roadway components.

The concept of splines is available in mathematics. Though originally referring to a thin flexible rod used to draw curves, the term is mathematically understood as a function fit in which the fitting function has some number of continuous derivatives. Thinking further about the vehicle and steering wheel example above, one can see that in order to minimize disruptive changes in steering, a vehicular path should be a spline with respect to heading change over distance traveled, with the first derivative of heading change per unit distance—that is, curvature—being a continuous function. This type of function will be referred to herein as the "clothoid spline."

SUMMARY OF THE INVENTION

Embodiments of the invention are methods for applying clothoid curve values to roadways in a geographic data information system. One embodiment is a method, comprising: selecting database segments in the geographic data information system, wherein the database segments describe roadways; determining segment chains from the selected database segments; preparing the segment chains for transition to curvature space; transitioning to a curvature function in the curvature space, by computing heading change at points along the segment chain, resulting in a transformation of the segment chains into clothoids; smoothing the curvature function; fitting the smoothed curvature function with a more generalized form which remains within a selected tolerance of the smoothed curvature function; and storing identified segments of straight lines, transition zones, and segments of constant curvature in the geographic data information system.

BRIEF DESCRIPTION OF THE DRAWINGS

Embodiments of the present invention will be described in detail based on the following figures, wherein:

FIG. 23 shows sample code to generate least squares fit of a linear piecewise function;

FIG. 24 shows the Gaussian weighted value integral for a linear function at a point labeled as zero;

FIG. 25 shows a Gaussian approximation summation applied to a linear piecewise function around a point;

DETAILED DESCRIPTION OF THE INVENTION

Figure 1A:
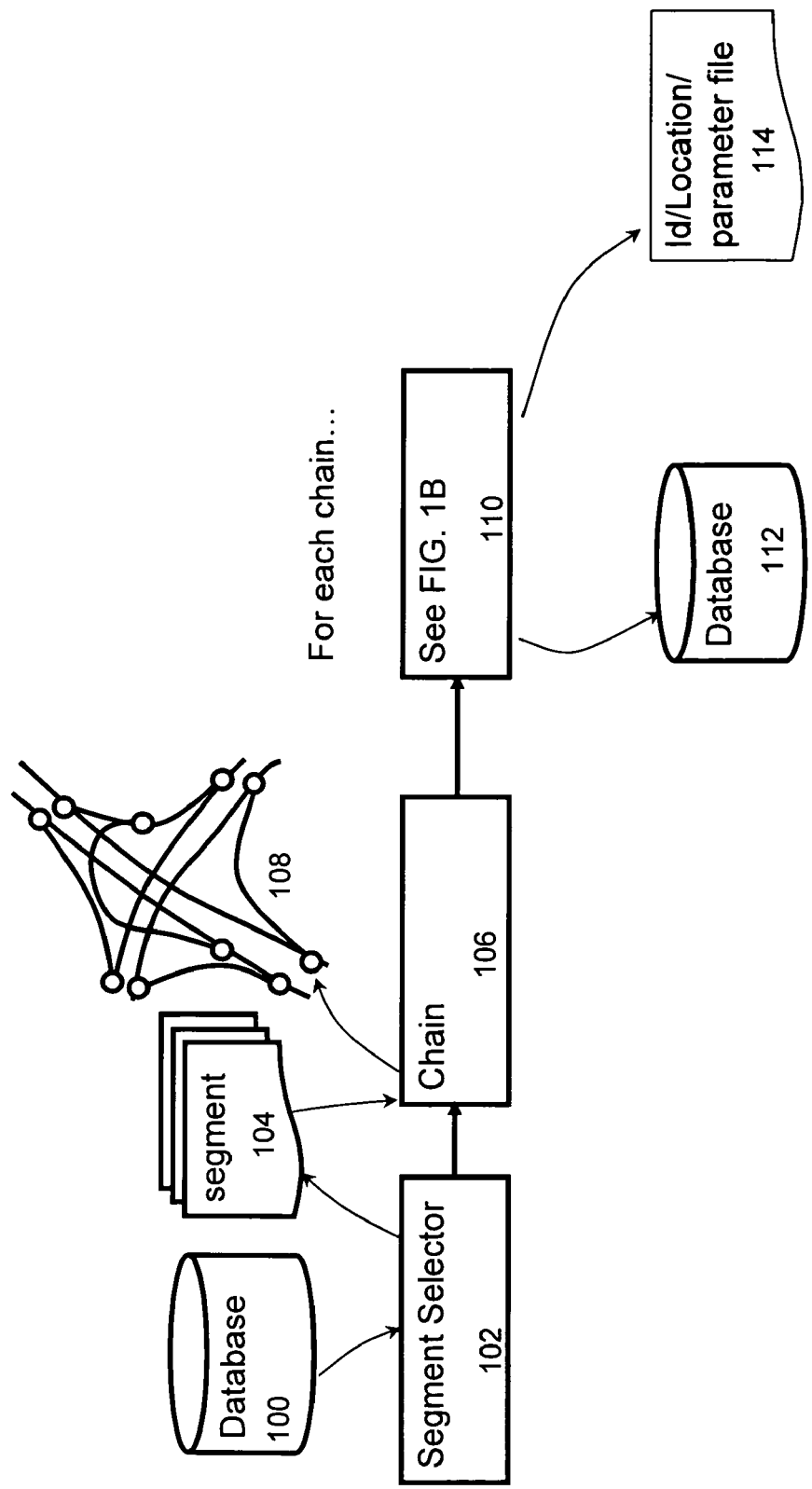
FIG. 1 shows the design for the process for one embodiment.

Important applications such as vehicle safety systems and Advanced Driver Assistance Systems (ADAS) require road path information that is not explicitly derivable or available in a line-segment representation. Such systems generally have need for the instantaneous curvature of the feature, centered at the point on that feature nearest the current location of a vehicle or probe. Instantaneous curvature information can also be used to dramatically improve the image rendering quality of the map display.

The clothoid is also a fuller, more accurate, and often more compact geographic storage model than the shaped line representations of most map databases. The present invention captures curvature values and rates of change from a pre-existing map database.

In order to meet the needs of Advanced Driver Assistance Systems (ADAS) automotive safety systems and driver comfort enhancements, along with other present and future applications, the present invention discloses a method to determine line segments, circular arcs, and clothoidal sections that form the portions of any path of travel represented in a geographic database.

In one embodiment, the segmented data is represented as a clothoid spline, in that the parametric data defines a curve in which the entire path is represented by clothoid segments, and in which the curvature at the common point between any two clothoid segments will be guaranteed to be continuous and unambiguous.

One alternative embodiment improves the shape of database segments using the clothoid spline that was previously generated by this invention, converted back to a shaped line. One embodiment uses the method of this invention to improve a geographic database or customer data that is represented in line segment form. One embodiment generates a clothoid spline, and subsequently converts that clothoid spline into a shaped line; and finally replaces the original database segment shapes with those of the generated shaped line. Another embodiment generates a clothoid spline; subsequently converts that clothoid spline into a shaped line; and finally replaces or adjusts the customer data representation with the shape of the generated shaped line. One alternative embodiment improves real-time display.

Glossary and Conventions:

One embodiment of the invention describes and graphs curvature with units of diopter (1/radius), with the convention that positive curvature values induce a chosen direction of travel to bear left, and negative curvature values cause said travel to bear to the right. This convention is to be regarded as illustrative and not intended to limit or define the scope of the invention to the use of such representation units or direction.

A travel direction in the illustrations is further defined as a notational convenience.

Segment: a segment (or a road segment) is a linear element in the geographic database, having position and other attributes, and typically represented in the shaped line geographic model. In some databases segments may be topologically integrated with other features.

Geographic Database: the term geographic database is used herein to refer to any data storage model that consists of elements associated with a geographic position, including one or more of point location, linear path, and/or area. Elements of the geographic database are typically topologically associated, by junction (endpoint meeting points) and perhaps other geometric qualities. Data elements may be associated with each other, or with non-geographic entities, and may contain non-geographic attributes such as, but not limited to, name, classification, importance, address ranges, census division.

GIS: A geographic information system, or GIS, refers to a system of database access providing spatial and/or relational access to members of a geographic database. GIS systems are often associated with a map display, but need not be so limited: they may also comprise tabular lists, such as a list of nearby restaurants and hotels, or may be embodied as intermediate spatial data delivery systems employed within larger information systems.

Roadways and Junctions: One embodiment applies clothoidal curve values to roadways, and uses the at-grade roadway decision points (junctions) as convenient locations for dividing said roadways into manageable lengths for computation and representation. There is actually no reason to limit such analysis to roadways; and segmenting pathways other than through the use of street junctions could be construed. These conventions are illustrative in nature, and not intended to limit the scope of the invention.

Inherent Difficulties

Curvature represents the rate of change of the heading of a path. Shaped line data by comparison is composed of segments of constant heading, with discrete changes in heading occurring at the shape points; its heading's first derivative is discontinuous with a value of zero punctuated by infinite instantaneous change. This mathematical distinction between the two data formats results in great difficulty in deriving curvature from straight segments.

Furthermore, any line segment map database will be beset by both data capture and precision error. Both errors are a function of the type of capture used: whether it is the mechanical approximation of a stream of GPS points and the limits inherent in its coordinate system's precision, or the human/machine error of digitizing to an overlaid aerial photograph—in which both the rendering system's spheroid error, pixel digitization limitations, and the human's limitation in seeing and clicking the appropriate center point of a path contribute. These errors can result in line segments that wobble or "staircase," or have other undesirable artifacts—artifacts that are typically magnified upon conversion to a curvature model.

The simple "three point method" of computing curvature illustrates these difficulties. Curvature can be approximated wherever a pair of line segments touch (the shared point and each line segment's opposite endpoint form 3 points, hence the technique name). This method computes the directional change at the shared point and divides it by half the sum of the lines' length. Successive values so computed form a rough curvature model. This conversion is unstable, being overly sensitive to the following:

Shape point density: when more shape points are added to data of a given accuracy, even though the new shape points may be of the same accuracy, the curvature model acquires more and more noise. That is, the closer the shape points, the curvature denominator (traversal distance) drops. At the same time, the numerator, angular change, becomes more susceptible to small perturbations—for example a single unit of placement error will result in roughly twice as much angular error when the shape point density is doubled. As a GIS becomes more richly and carefully shaped, we ironically discover its curvature noise profile increases. The magnitude of curvature error in the three point method caused by a small perturbation in any shape point is unbounded as the distance between shape points approaches zero.

Shape point density non-uniformity: the most accurate line segment database will have a shape point where a curved section begins or ends, but does not accurately portray the curvature at that point, because shape points are considered unnecessary in the adjacent straight line path. Curvature algorithms that do not account for this will issue non-zero curvature values to straight paths, and will under-represent the curvature at the boundaries of curved sections.

A final difficulty is the fact that road shape to curvature conversion from shaped lines to curvature yields no error measurement or bounds: one cannot "tune" the raw conversion to limit the amount of error introduced.

Limitations in State of the Art Technologies for Computation of Road Shape to Curvature Conversion Three point method: as described above, this is unstable and very noisy, with no control over conversion error. Some variants of the algorithm utilize pre-generalization, or the converse: inserting intermediate collinear shape points to longer lines. These variants may reduce some artifacts, but not robustly: a small change in shape point's position can affect its inclusion in generalization, yielding drastic differences in results from basically the same data.

Hough transform: (U.S. Pat. No. 6,732,046)—The Hough transform produces geographic smoothing, and its sensitivity can be tuned to avoid unnecessary jitter in results. Yet the Hough transform does not robustly handle clothoid segments or other areas of non-uniform curvature. Furthermore, the Hough transform is sensitive to the stepwise collection buckets used for discovering radius and angle of azimuth: too few buckets and the sensitivity becomes markedly non-uniform based on orientation or radius; too many and the technique becomes computationally prohibitive. In addition, its computational burden in general makes it an undesirable database analysis tool.

Psi-s modeling: (U.S. Pat. No. 7,152,022)—The conversion from coordinate space to psi-s allows for smoothing; unlike Hough it is not sensitive to arbitrary bucket design decisions; it can be used to find clothoids; and it is computationally simpler. Yet this technique suffers from discontinuities in the computed curvature values at the interfaces between adjacent curve fit segments—thus it is not a well formed clothoid spline (see FIG. 1—the left-hand curve 104 illustrates this type of deficiency). It allows no ready means to limit or measure the representation error introduced by the conversion from shaped lines to curvature. Further, finding clothoids in the segmented results requires the code to match parabolic functions—a level of complexity not required in the approach of the present invention.

Use of Bowing Coefficient: (U.S. Pat. No. 6,681,177)—This technique avoids the complexity of parametric curves altogether by reverting to a simple distance-of-travel versus chord distance measure. The method is computationally simple and can be relatively insensitive to jitter in the coordinate data. However, it suffers from "over-generalization"—data is collected at specific points and for specific distances (the bow length). In its lowest bowing length extreme, it is merely an analogy of the three-point method. With higher lengths, it becomes a generalized depiction of a certain length of road. This means that sharp curves, relatively quick changes in curves, and the beginning or ends of curves, are improperly characterized. Furthermore, this technique produces dense data with no facile technique to reduce the data by detecting clothoid sections, nor does the method provide means to limit or measure the induced representational error introduced by the conversion from shaped lines to curvature.

Standard Splines and Polynomial Equation Fit: Polynomial equation techniques such as the cubic spline are available in the prior art; these equations can be fit to geographic paths with remarkable positional fidelity and few control points. However, such polynomial equations can generate artificially large curvature values, making them generally unsuitable for vehicle navigation and safety systems.

Dual Road Geometry for Representing Position and Curvature-Heading: (U.S. Patent Publication No. US2007/0288158 A1)—The technique of using dual geometry representation attempts to solve a different problem: the fact that shaped lines often conform to connectivity restraints and other prohibitions that prevent them from representing the actual vehicular path in a given roadway. That technique can be useful when the actual path of vehicles is known, or when multiple paths are available for a given roadway segment. Different travel paths and uses might invoke different conversion methods or parameters. In such cases both geometric and curvature representations can be generated from multiple paths. However, that technique doesn't teach a particular method of producing curves (though it refers to the standard methods for producing splines and clothoids, already outlined above). Thus, the technique is limited in the same ways as described above. In addition, the dual road geometry representation technique is limited to cases where multiple representations are available or can be externally derived. In contrast, the present invention includes a method of determining curvature without producing irregularities, by using the roadway's context and known transition rules, and requires only a single shape representation.

Differentiating Aspects of the Teleatlas Clothoid Algorithm

By contrast, the present system alleviates the problems described above and produces a bounded error model in the curvature domain.

Shape Point Density

The algorithm of the present invention is robust at any level of shape point density. It uses minimal or no generalization in the spatial domain. Instead, the predominant smoothing occurs after conversion into curvature/distance space. The difference is profound, since jitter in the input data tends to confound generalization—jittery points can survive generalization whereas important nearly-collinear intentional shapes can be lost—yet jitter is easily smoothed by a Gaussian filter over the resulting curve. A doubling of shape points, which will roughly quadruple error noise in the simplistic three-point curvature algorithm, will merely mean twice as many data points under each Gaussian filter. The algorithm of the present invention is a robust conversion that actually increases in fidelity with increasing shape density.

Shape Density Non-uniformity

The technique of the present invention deals with the interface between longer straight lines and the shorter lines involved in a curve by inserting additional shape points as needed, based on a calculation of error using the relative accuracy confidence. Doing so produces curves with the appropriate blend of fidelity to the original line work, while avoiding the unnecessary discontinuity in the curve parameters that can result from line densification, an adaptation often attempted in alternative techniques.

Simplicity

Shapes converted to curvature/distance space are amenable to simple first-order regression analysis. In one embodiment, a parametric clothoid spline is generated by solving in curvature/distance space a series of simple, piecewise (first order) least-squares analysis, in which the error is bounded inside each. Furthermore, the technique is particularly facile for identifying abrupt changes in the curvature, yielding ready points for segmenting the linear approximations. The simplicity of the technique yields a very small, comprehendible, and efficient computer algorithm.

Error Limitation/Control

The error induced in representation is balanced against the likely jitter of the source. Start with optional generalization and the Gaussian filter in the curvature/distance domain to remove jitter. The amount of such smoothing is based on the known or determined relative accuracy of the path; it induces a small localized error well within the path's accuracy limit. The spline fit of first-order least-squares segments can be parameterized to limit the total curve error and overall Root Mean Square Error (RMSE) to whatever practical values are required.

Clothoid Spline Representation

Figure 2:
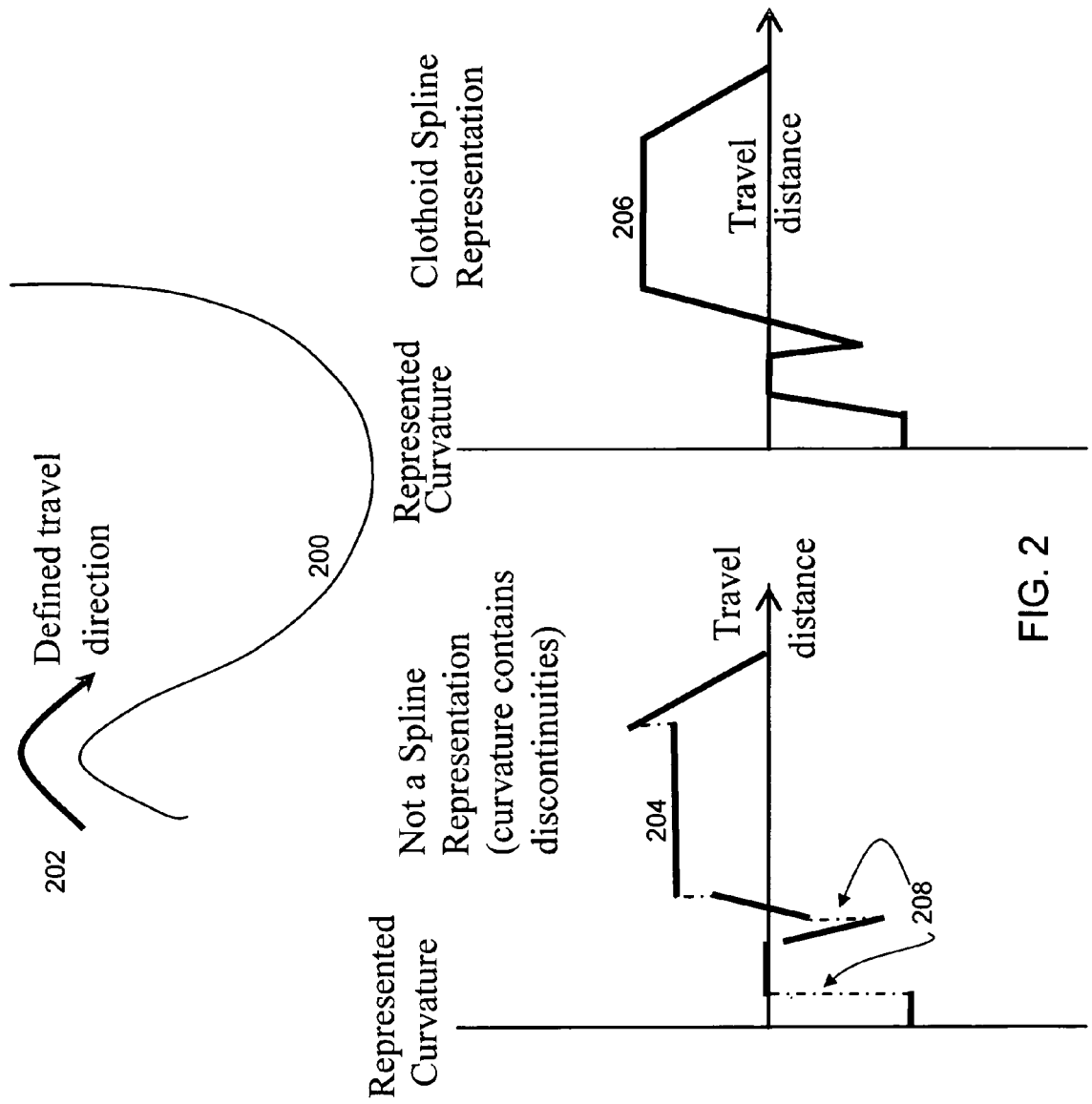
FIG. 2 compares two clothoid representations of a curve.

The technique of the present invention generates a clothoid spline. FIG. 2 illustrates the differences between a noncontiguous curve representation and a spline. In the figure, a geometric curve 200, shown with arbitrary direction of travel 202 for clarity, is represented by both a noncontiguous curvature function 204 and a spline curvature function 206. Dashed vertical lines 208 illustrate the discontinuities in the noncontiguous curvature function 204. Said discontinuities 208 are undesirable for applications in which a curvature value relates to a warning level, an aiming device position, a maximum safe speed, or other physical state, because the discontinuity requires an instantaneous and abrupt change to said state.

1. Overview

One embodiment is constructed as a process illustrated below in FIG. 1:

Segment Selection The method of the invention selects segments from a database 100, using a segment selector algorithm 102, to produce a collection of segments 104. The segment selector can use any of prior art techniques, notably relational query or geographic selection, or some combination of the two, though it needn't be so constrained. Multiple queries might be employed in order to garner a contiguous network of segments within a region for a certain mode of travel, or to meet specific application needs. Numerous selection means exist in prior art.

Segment Chaining: A segment chaining algorithm, 106, organizes the collection of segments 104 into chains 108, of meaningful length (such as streets from one junction to the next junction). The only requirement on such chains is that they represent an unambiguous path without internal branches or discontinuities; the paths themselves may cross as needed.

Perform a Process on each chain, as illustrated in box 110, which will mathematically decode the chain into a clothoid spline, as follows:

Find Corner Interfaces: at adjacent shape edges where the osculating circle deviates by more than a known relative accuracy from the shaped line.

Place Chain in Geographic Context/Transition Analysis: Find prior and next "expected" travel segments (based on type, classification, Form of Way (FOW)). Extend the geometry into those zones; interpret length of transition zone (if any) using FOW/classifications. Remove shapes within transition zone.

Convert to Curvature-Distance System: Represent chain in Distance/Curvature coordinate system. Clip geometry back to valid region.

Gaussian Smooth Apply Gaussian smooth filter in Curvature space.

Basic Curve-Fit: Apply a successive or recursive curve fit technique (for example, least-squares linear fit, bifurcating at furthest data point from the trend line until the error criteria is met).

Flat and Zero Affinity: iteratively attempt flat-line and zero-point replacements.

Result: Following this process, the resulting clothoid spline is available for a wide variety of uses; its parametric values may be appended to the original database, depicted as 112 in FIG. 1. The database, 112, may be updated with improved shapes as described herein. Alternately or additionally, one or more files, 114, may be written to associate the clothoid spline with the geometry. Such files may in turn be used for further processing, for deferred updates to the database, for delivery to consumers, or as direct input to devices such as ADAS units.

2. Segment Selection

Select segment types of interest within area of interest, or using other criteria of interest. In one embodiment, a segment selector is a component that selects the segments of interest. Alternative embodiments are contemplated to select the database segments that will be analyzed for clothoid representation. A query based on a segment's type (e.g.: street versus land use feature), or location (e.g.: within an area of interest), or topology (e.g.: connected to other segments deemed interesting), or any combination of these and other criteria might be used to form the selection.

3. Segment Chaining

This portion of the process produces chains of meaningful extents: e.g., each chain a "no-decision" junction-to-junction path. Chains represent the selected streets, with junctions providing topological relationships between adjoining chains. In one embodiment, segments are chained based on expected vehicular travel. In particular, any street junction that represents a possible decision to exit or enter traffic on the street is an important location used to distinguish one travel chain from others. A dead end within the selected network of segments is also an important location at which traffic flow or the area of interest ends. Traverse the plurality of important locations, finding each geographic chain of segments that traverses from a given important location, and touching no other important location, until it reaches the same or another important location. Chaining provides the opportunity to perform an analysis over a meaningful distance from the customer standpoint.

4. Find Corner Interfaces

For each chain, it is important to detect interfaces between straight line sections and either curves or other straight line segments. Examples are shown below. This detection is needed because shaped line segments assume that the travel path is approximately linear between shape points, a fundamental difference from a curve-based representation. Without such interface detection, any resulting curve will erroneously indicate curve on straight sections, and under-represent curvature at the interface area. A very light shape point generalization may be advised prior to interface detection, in order to remove unintended collinear shape points caused by topological intersections with non-selected features.

Figure 3:
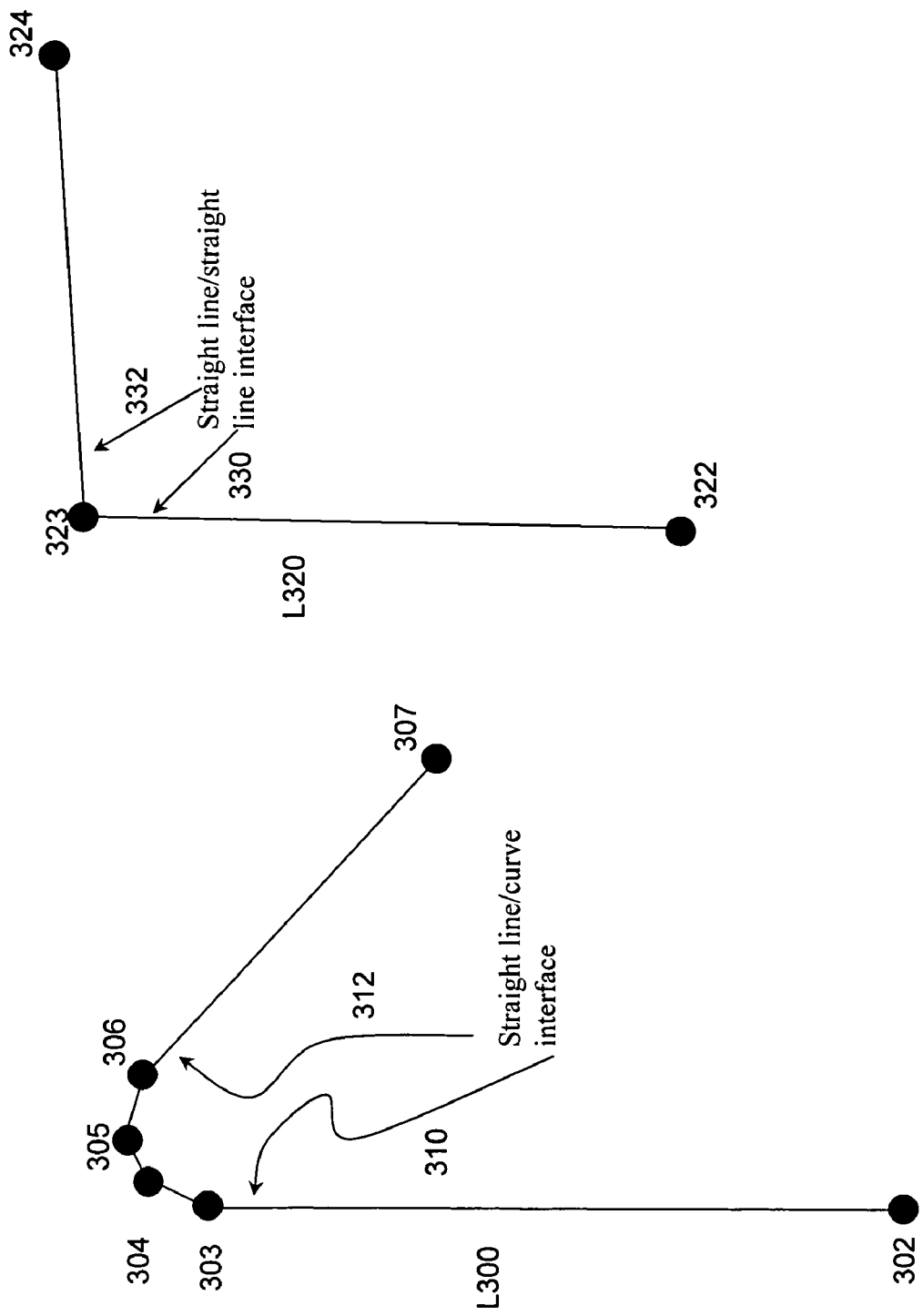
FIG. 3 shows curvature and straight line interfaces.

FIG. 3 illustrates curves that contain straight line interfaces. In the geometric line L300, containing shape points 302, 303, 304, 305, 306, 307, the line segments within central points 303, 304, 305, 306 comprise a turn, while the line segments between 302, 303 and between 306, 307 are intended to represent straight line travel. An interface between straight line and curve section is implied as shown by arrows 310, 312. In the geometric line L320, containing shape points 322, 323, 324, the two straight line segments between 322, 323 and 323, 324 meet with an abrupt heading change at the single point 323. That change at point 323 implies a quick curve, bounded by two inferred straight line-to-straight line interfaces illustrated by arrows 330, 332.

The present system utilizes the relative accuracy of the data to determine whether any given shape point trio is likely a constant curve, or an interface. Relative accuracy is a measurement of how far the data's successive internal shapes might vary with respect to each other irrespective of heading changes in reality. In captured data, relative accuracy is limited by cumulative process inaccuracies such as human perception limits, pixel (pointing device) quantization, image accuracy, image registration or orthorectification errors, probe vehicle device jitter, geometric generalization, etc. A relative accuracy claim might be supplied with source material, or can be inferred to be a proportion of the more common absolute accuracy claim. That is, anecdotal evidence in geographic data suggests that relative accuracy is often well represented as 25% the distance of the data supplier's absolute accuracy claims, though this proportion may vary in other domains. In cases where no source material claims are found, relative accuracy can be inferred by observation such as manual sampling of point quality with respect to available imagery, or other similar means.

Figure 4:
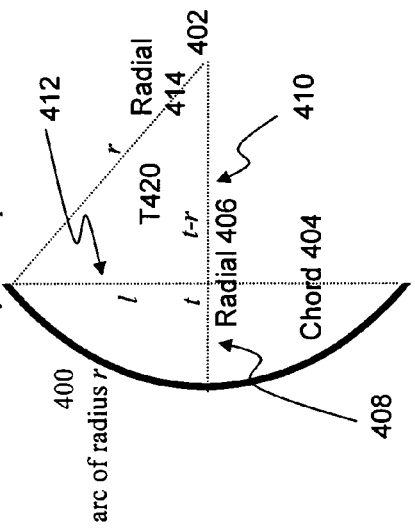
FIG. 4 shows the geographic rationale for equation 1: the maximum chord length for a radius of curvature yielding at most a maximum tolerance of error.

The present invention processes successive trios of shape points in each chain. Referring to FIG. 3, shape points 302, 303, and 304 are an example of a single shape trio on chain L300. For each such trio of successive shape points in the chain, the process derives the radius of the theoretical osculating circle based on those three points, and determines the maximum chord length for which that circular radius would remain within the relative accuracy tolerance. Such maximum length is calculable from Pythagorean geometry as shown in FIG. 4 (Equation 1). If one or both attached line segments are longer than this limit, then a simple curving interpretation of the area between shape points is insufficient to meet the accuracy claims, and this is construed to be an interface between straight line and curve. In that case the invention proceeds to insert additional shape points in order to ensure that later stages interpret the chain correctly as an interface.

FIG. 4 illustrates the geometric means for calculating the maximum allowable chord length when the radius of curvature and the expected error tolerance are known. Given an arc 400 of radius r as shown with circle midpoint 402: one can see that a straight line chord 404 between its endpoints, having length l, bisects a radial path 406 between the arc 400 and midpoint 402 such that a portion 408 of radial 406 rests between the arc 400 and chord 404. The length of line 408 represents the maximum error distance between the arc 400 and chord 404. The length of the radial portion 408 is assigned a value of t—our maximum error tolerance—such that other portion 410 of the radial 406 has a length of t−r. Using the Pythagorean Theorem on right triangle T420 formed by the radial 406, radial 414, and the half-chord 412, we can arrive at the maximum length of 412. Solving and doubling that length to get the length of chord 404, gives the maximum chord length that can be encountered if a straight line shape is truly intending to model a path of radius r within error tolerance t.

Figure 27:
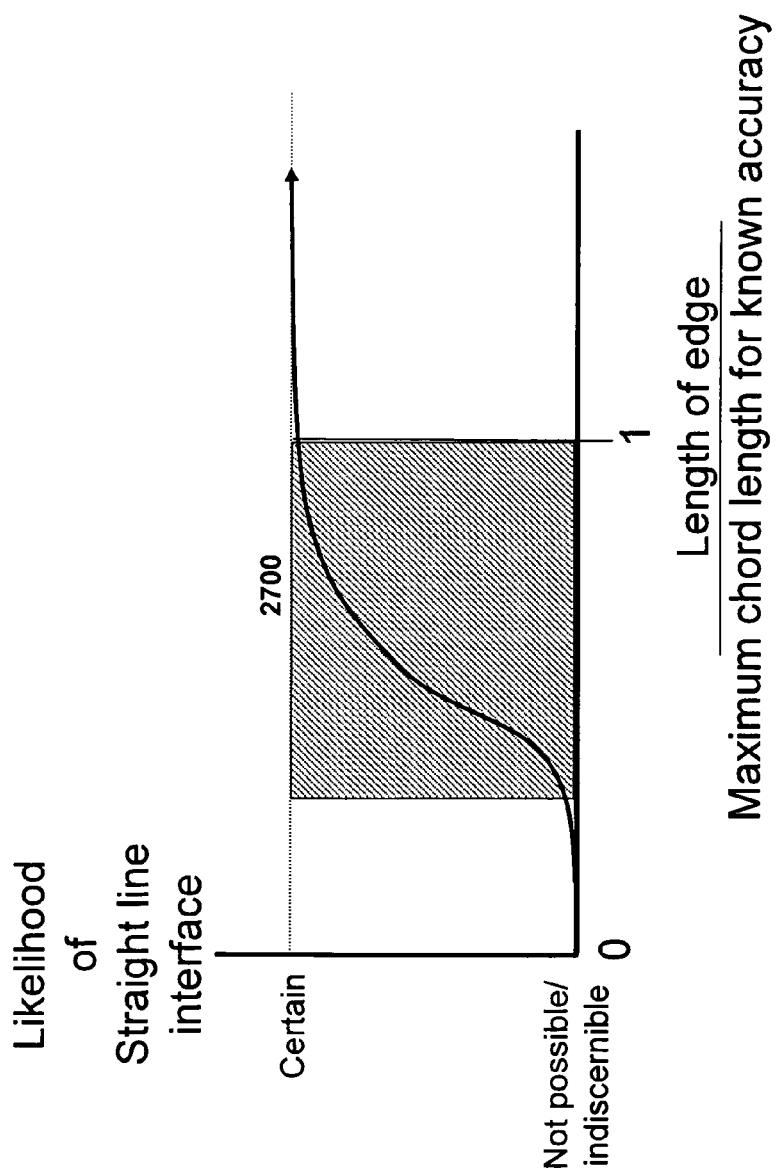
FIG. 27 shows an illustration of the likelihood of whether a line segment is a straight line or part of a curve.

In actual practice, deciding whether a line segment should be a straight line or part of a curve is not entirely certain. It is a likelihood, rather than a yes/no decision, and is more like the curve shown in FIG. 27. A line segment is virtually certain to be a straight line when the edge length exceeds the calculated maximum chord length, as described above. And when the line segment is substantially shorter than that calculated length, it is either part of a curve, or is so short as to be indiscernible from a curve at the given digitization accuracy—and thus may be safely considered a curve segment. However, line segment lengths that are uncertain, as indicated by shaded area 2700, will occur. It is possible to ignore such cases, and assign a yes/no breakpoint at some location within the shaded section.

A better way, as employed in this invention, is to use a sliding scale of maximum chord length, using additional local information known to affect the digitization. For example, we know that a line segment intended to indicate a straight line will usually be much longer than its curved representation neighbors. So the lengths of the two line segments involved in the chord calculation are compared: if the length ratio of the longer versus smaller adjoining line segments is exceedingly high, then it is more likely the beginning of a curve and the length tolerance is commensurately reduced within the shaded area 2700. Specifically, we consider r, the ratio of longer to shorter segment lengths, and constrain it to within the range of 2 to 8. Our interface detection tolerance is: maximum_chord_length/$\log_2(r)$, which gives us a sliding scale between ⅓ to 1 times the originally calculated maximum chord length.

Also, roads are more often constructed with straight ends when they approach 90-degree T junctions. Thus the final line segment of a chain that ends at a near-90-degree T junction is more aggressively detected by halving the chord length tolerance as calculated above. These and other similar adjustments may be applied based on real-world domain knowledge or knowledge of the data supplier's error factors.

When an interface is indicated by the calculation, an additional collinear shape point is inserted so that later curvature calculation will distinguish the straight section as being actually straight. The insertion proceeds as follows:

If only one attached edge triggers the maximum chord length, insert a collinear shape point on that edge near the center point, such that a new line segment of the same length as the shorter edge has been created.

If both edges trigger the maximum chord length, create a collinear shape point along each edge near the center point, at a distance of $d=r\theta$ where r is a certain standard minimum radius for the path type, and $\theta$ is the current angle between the line segments. For example, one embodiment uses a 4-meter minimum radius for surface roads and parking lots.

Figure 5:
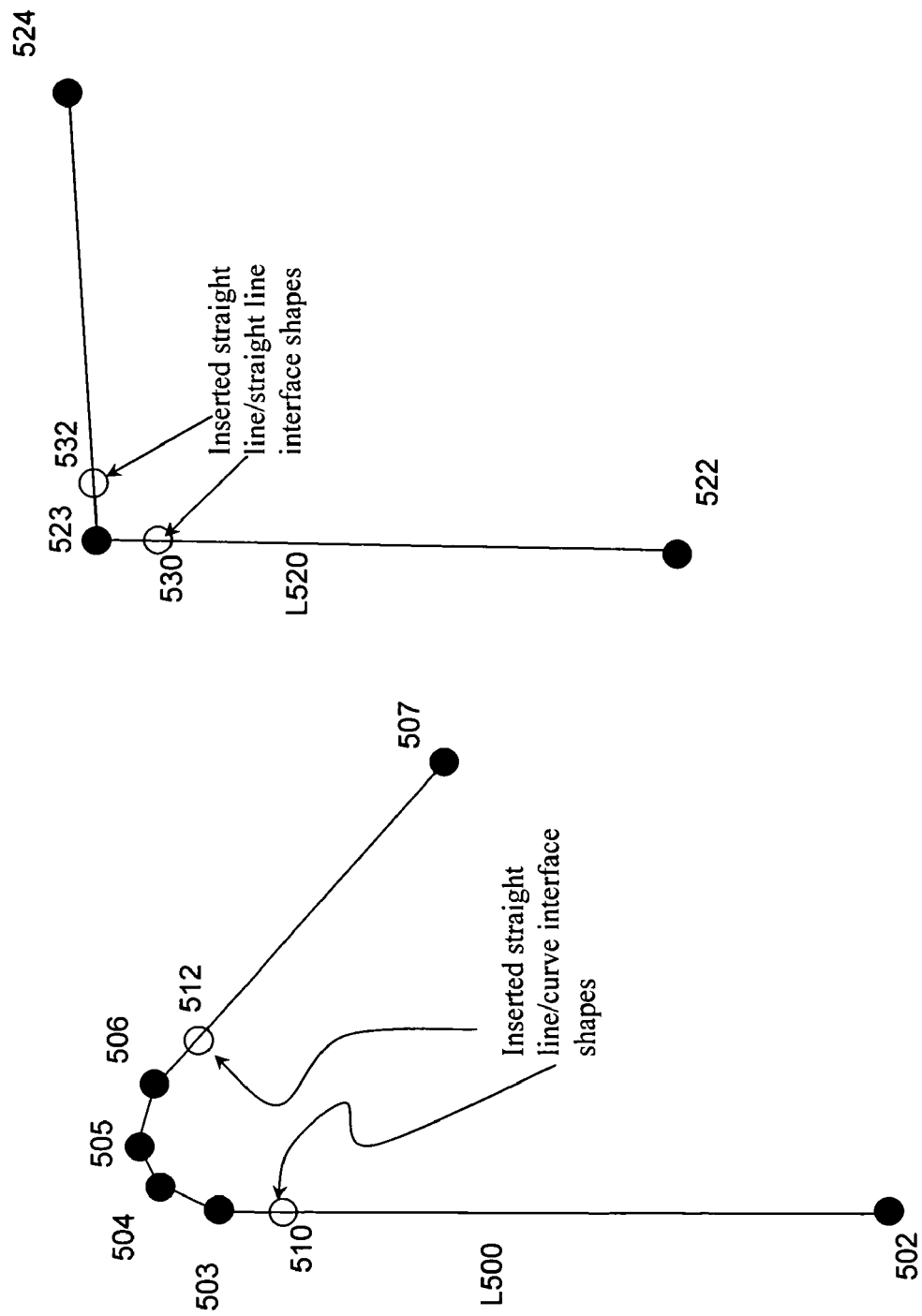
FIG. 5 shows curvature and straight line interfaces with added shapes.

FIG. 5 illustrates this process for the shapes previously considered in FIG. 3. New shape point 510 is added to L500 between shapes 502 and 503, and new shape point 512 is added to line L500 between shapes 506 and 507. Similarly, shape point 530 is added to L520 between shapes 522 and 523, and shape point 532 is added between shapes 523 and 524. All such shape points are collinear with the original lines, such that they demarcate a section in which curvature is zero.

In an alternative embodiment, mild generalization may be employed at this point, for the primary purpose of reducing computational effort later. Generalization should be limited to a tolerance of up to ½ the known relative accuracy. Such generalization must not remove any point inserted by the straight line interface detection process (points 510, 512, 530, and 532 in FIG. 5), nor any single shape point that has been identified as a straight line/straight line interface, such as point 523 in FIG. 5.

5. Place Chain in Geographic Context/Transition Analysis

Figure 6:
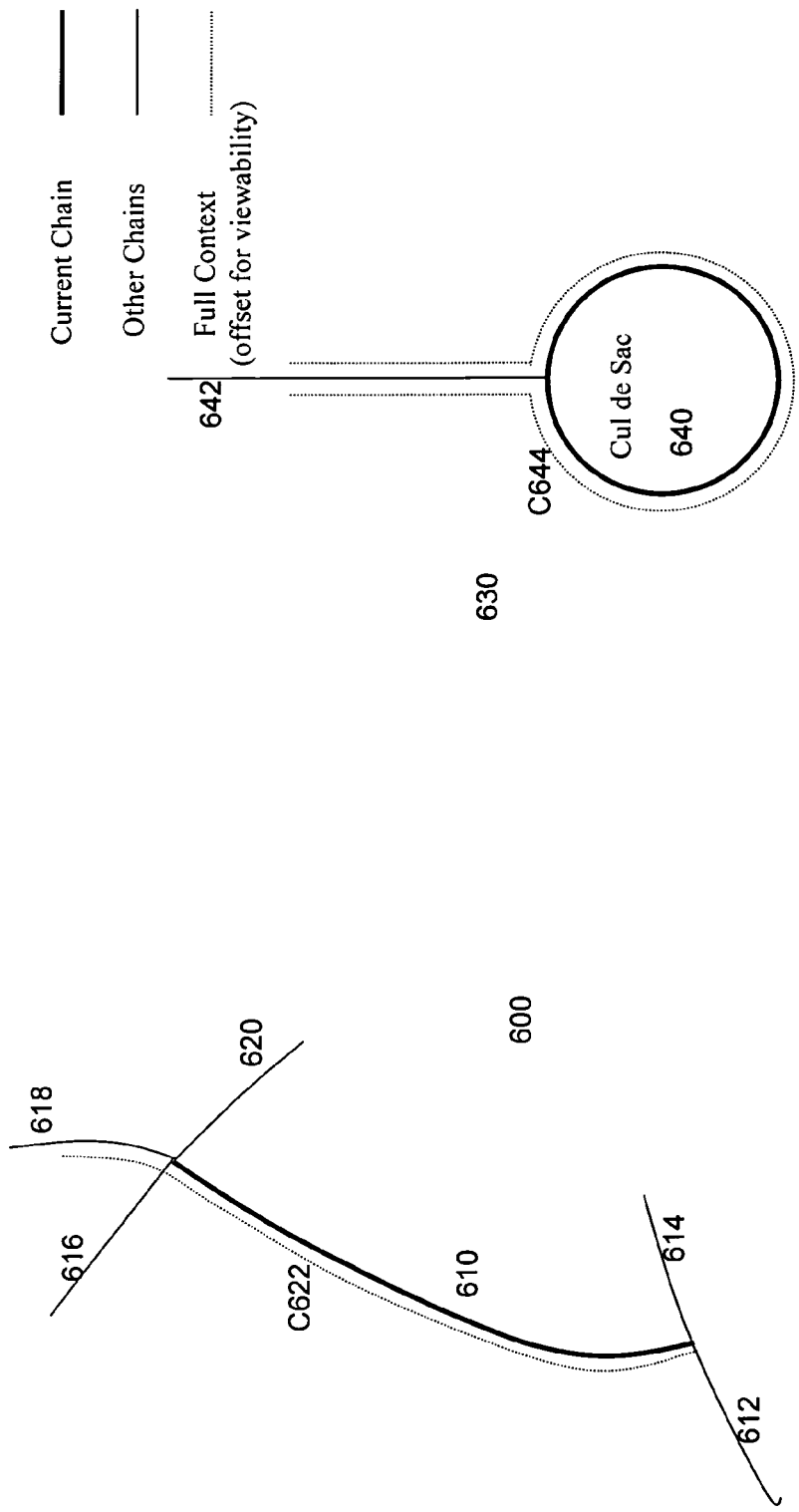
FIG. 6 shows add context for expected traversal path.

When there is a known expected travel path from the given chain to other chains, a portion of their geography may be added to the chain's shape as context (FIG. 6). This ensures that the ends of the chain can be given curvature values that represent a broader view of the expected traversal path. The length of context should be at a minimum several times the Gaussian smoothing sigma value as described later, provided that length of context can be identified. For example, with roads in which the Gaussian smoothing sigma ranges from three to 15 meters, the present system retrieves up to 50 meters of context.

FIG. 6 illustrates two such cases: in example 600, currently considered chain 610 connects at-grade with chains 612, 614, 616, 618, and 620. Only chain 618 is deemed an acceptable continuation chain; neither of 612 nor 614 is of the correct angle to be continued in the other direction. In that case, the context for chain 610, represented by dotted line C622, consists of the geometry of 610 and a portion of chain 618 that connects with 610. In the case of the cul-de-sac 640 in example 630, chain 642 is an acceptable match for both ends of the cul-de-sac's circular chain. The full context, indicated by dotted line C644, of the chain will consist of the cul-de-sac geometry, enclosed on both ends by a portion of chain 642 geometry.

It is possible that the geographic database has been modeled using rules that prohibit it from accurately representing a path in some circumstances. For example, street centerline merge points—at the ends of ramps or surrounding traffic islands—are often subject to geometric rules designed to provide acceptable route guidance instructions. In such cases it is important to determine whether the data represents true travel, or simply an idealized representation, and to yield appropriate results in either case. In an embodiment that works with ramps, for example, it may be necessary to smooth or replace shapes in the vicinity of a road junction to more properly approximate the true travel path.

Figure 7:
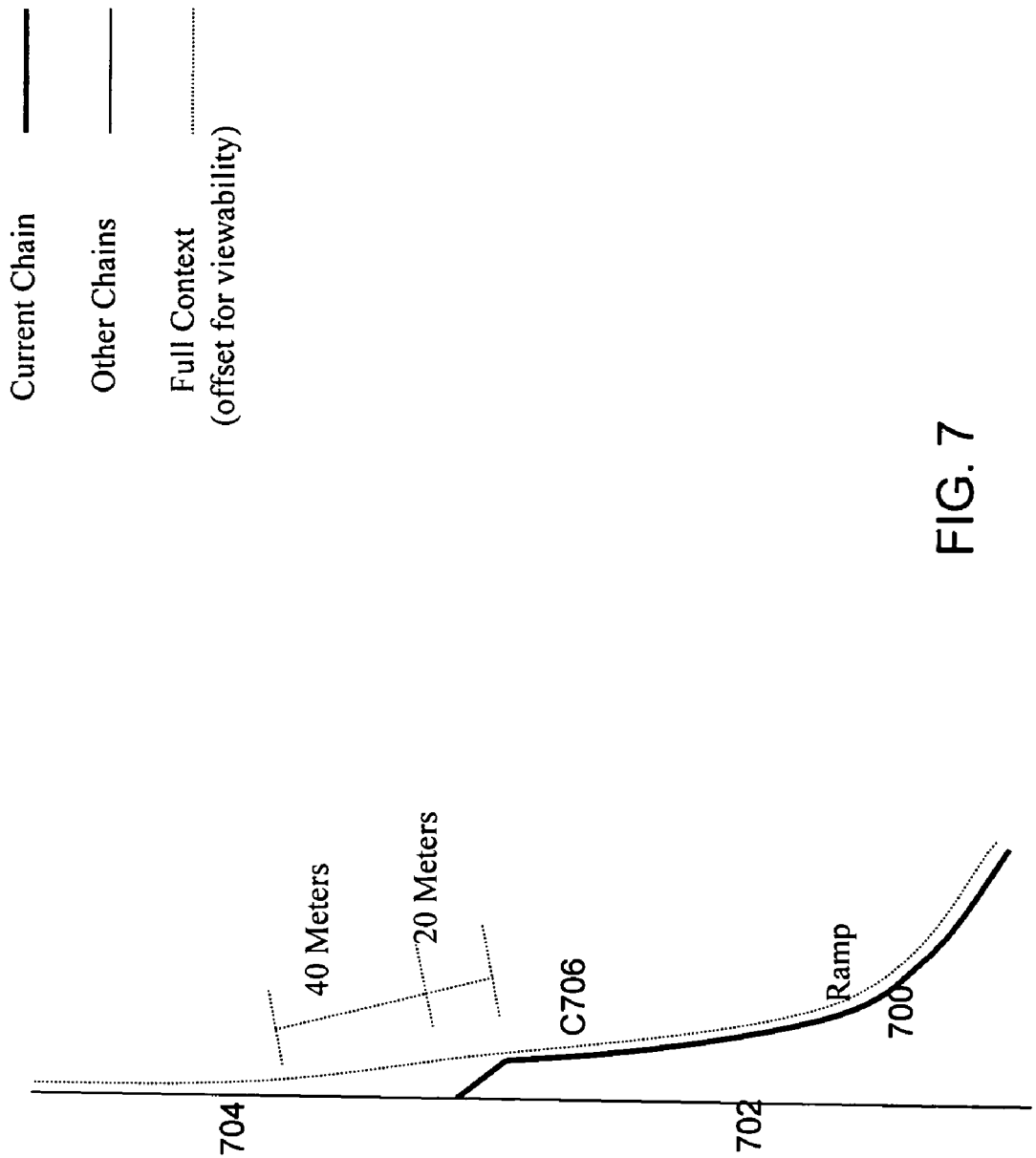
FIG. 7 shows ramp transition zones.

As a particular example, as shown in FIG. 7, it may be known that the geographic database requires all ramp ends at major interstates to terminate with a particular minimum approach angle, and that the effects of such constraint affect the ramp's representation over a distance of no more than 20 meters. It may be further known that the common merge distance beyond that point is 40 meters. In such cases the said 60-meter section can be replaced by a straight line. In other instances the invention could be used with known specific transition zones or other means for determining transition regions.

FIG. 7 illustrates a ramp, 700, as the current chain. A highway of chains 702, 704 intersects the ramp, and it is determined by general azimuth that chain 704 is the correct context chain. The full context, illustrated by dotted line C706, removes shapes within the final 20 meters of ramp 700 and the first 40 meters of highway chain 704.

At this point in the process a conditioned shape line represents expected traversal within the chain and the expected traversal between the chain and other nearby chains; the conditioned shape line also includes collinear terminal shape points to indicate the beginning and end of transitions between linear sections and curved sections. This line has been purposefully conditioned so that a simplistic three-point curvature generation technique will yield robust functional results that can be further improved within curvature space by the remaining processes of the invention.

6. Convert to Curvature-Distance System

One embodiment of this invention converts the conditioned shape line to curvature space. Curvature or diopter (in units of 1/distance-unit-radius) may be considered the y axis, and linear traversal distance along the path is the x axis. It is convenient to assign a single travel direction, and to consider one endpoint of the chain to be at location 0, with the remainder of the chain traversal accruing in the positive direction. Since some shape context might be present beyond the starting endpoint of the chain, it is deemed to be at a negative offset in the distance axis. Similarly, context beyond the final endpoint of the chain will be deemed to have an offset higher than the chain's traversal length. The curvature values within context zones (below zero offset; above chain-length offset) are not directly used, but are present rather to ensure the fidelity of shape point trio conversion at the edges of the chain's length boundaries.

In this embodiment the curvature function's form is further restricted to that of a piecewise linear function. Since the definition of clothoid is a continuous change in curvature over traversal distance, then this step represents a conversion of the shaped line directly to a clothoid representation. Furthermore, the piecewise linear function is continuous, thus it is a form of clothoid spline.

Figure 8:
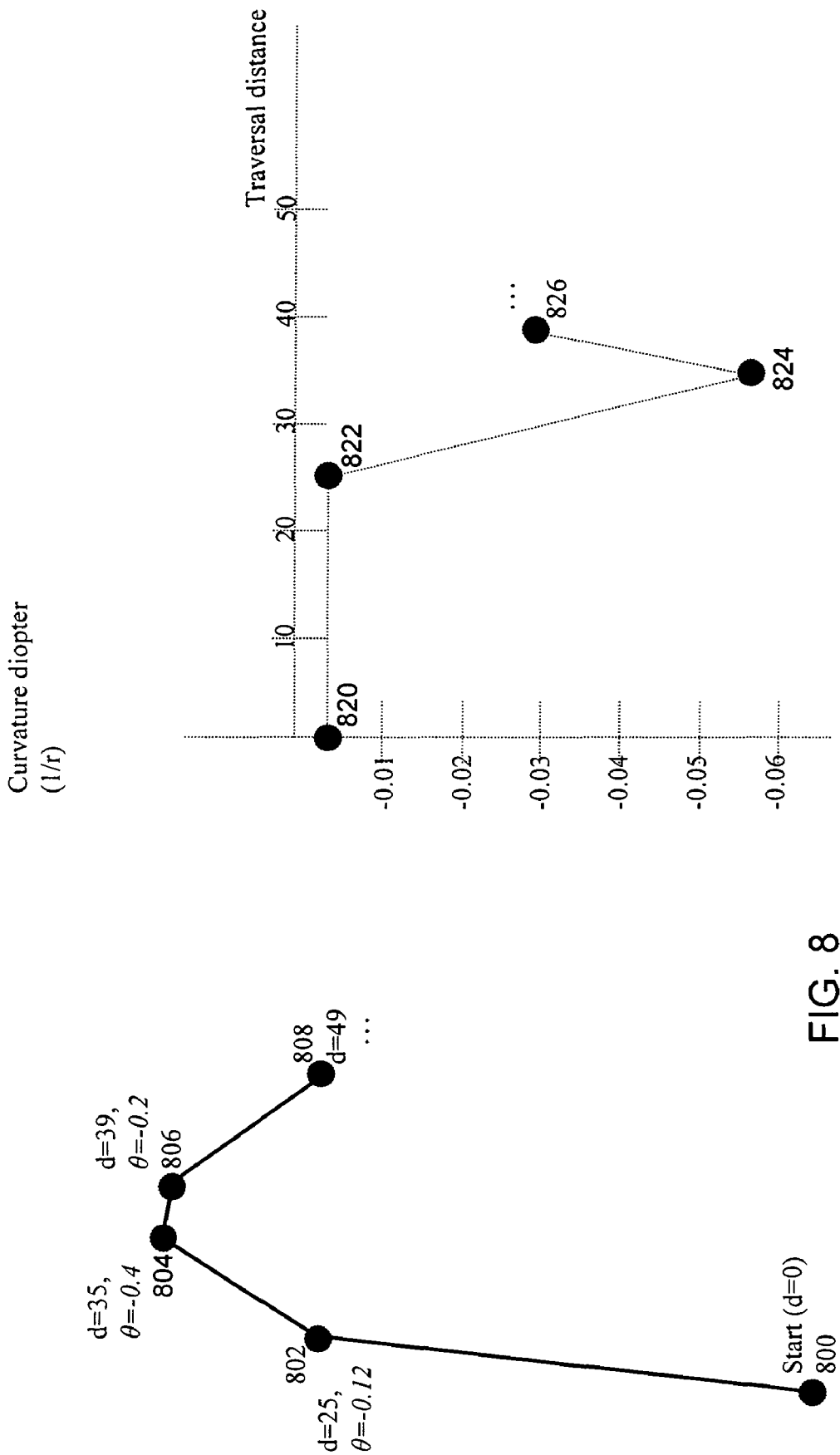
FIG. 8 shows curvature conversion.

In general, shape point trios are converted to curvature space by calculating curvature as the radial angle change divided by half the sum of attached line segment lengths. The only exception is the first and last shape trio, in which the end line segment's entire length instead of half that length is incorporated in the denominator. Each value so calculated may be plotted as the y value at an x value indicating the travel distance along the path (which may be negative for pre-start context points). The first and last values are also duplicated at the extreme distance positions. These measured values are connected with straight lines, as shown in FIG. 8. For ease of display, FIG. 8 shows a shaped line where the shapes begin at distance 0, with no negative context.

In FIG. 8, point 802 is calculated first, using the direction change in radians (−0.12) divided by the full length of the first line segment between points 800, 802 plus half the length of the next segment between points 802, 804. That denominator is (25+½*10=30). This value of −0.04 diopter is placed at 25 on the x axis, illustrated by point 822. Since it is the first line segment of the figure, the value is also duplicated at the low length extreme (zero distance), shown as point 820 in the graph. Point 804 has direction change of −0.4 radians; divide by half each attached line's length (½*10+½*4=7). Its value of −0.057 is placed at 35 on the x axis, illustrated by graph point 824. Calculations continue in this way until the entire path is converted.

7. Apply Gaussian Smoothing

In an embodiment of this invention, Gaussian smoothing in the curvature/distance domain replaces the historic reliance on geographic generalization in order to reduce relative-accuracy-induced noise. Gaussian smoothing in the curvature domain produces a more robust curvature graph.

The Gaussian smoothing width (or its sigma($\sigma$) value) can be chosen anecdotally; it is roughly the distance over which curvature change should be detectable. It should be a high enough distance so that unintended noise from relative inaccuracy is mitigated. As a rule, the Gaussian sigma should be at least 3-4 times the relative accuracy value. The Gaussian smoothed values will be used for curve fitting. Gaussian smoothing a may be selected solely on the basis of relative accuracy, or it may be additionally modified based on road use type (such as ramp versus highway), expected vehicle types, or other measures that could indicate the likelihood and frequency of curvature change in the real feature. Note that relative accuracy or other measures used to determine the Gaussian a may vary, thus in the means described in this invention, the Gaussian smoothing width need not be constant for all segments under consideration, or even within a given segment. Appendix 2 further describes a $\sigma$ width-insensitive method that can be used to simplify the computation for Gaussian smoothing.

Figure 9:
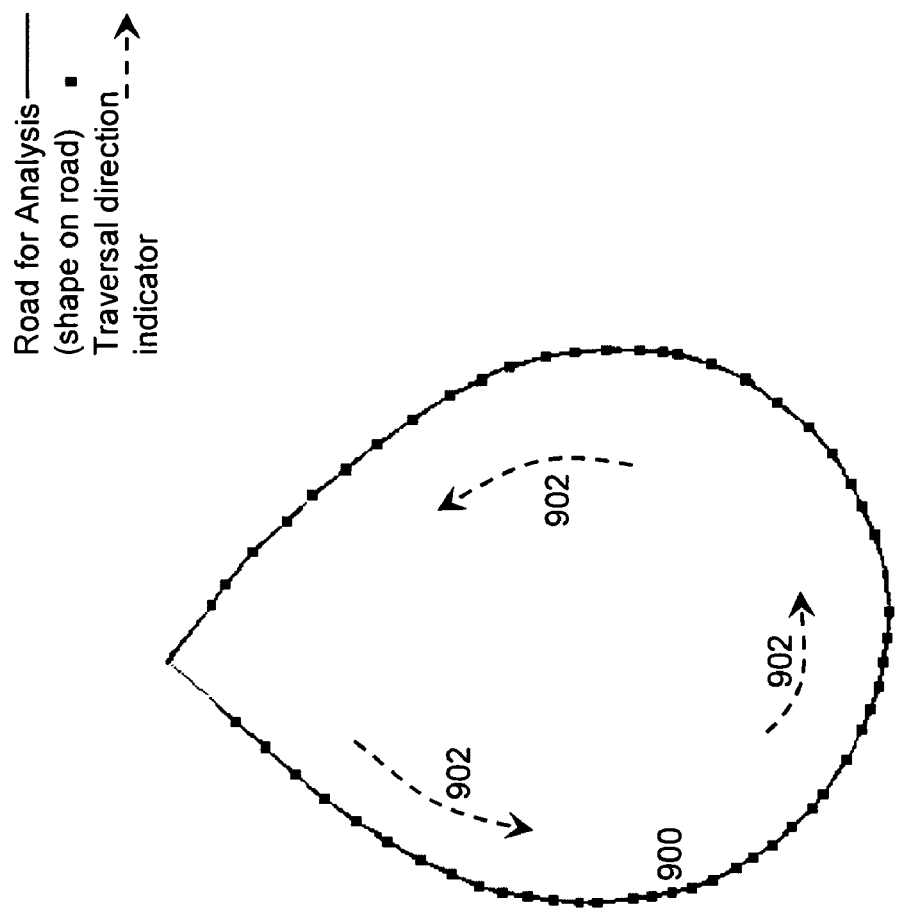
FIG. 9 shows a road section for analysis.
Figure 10:
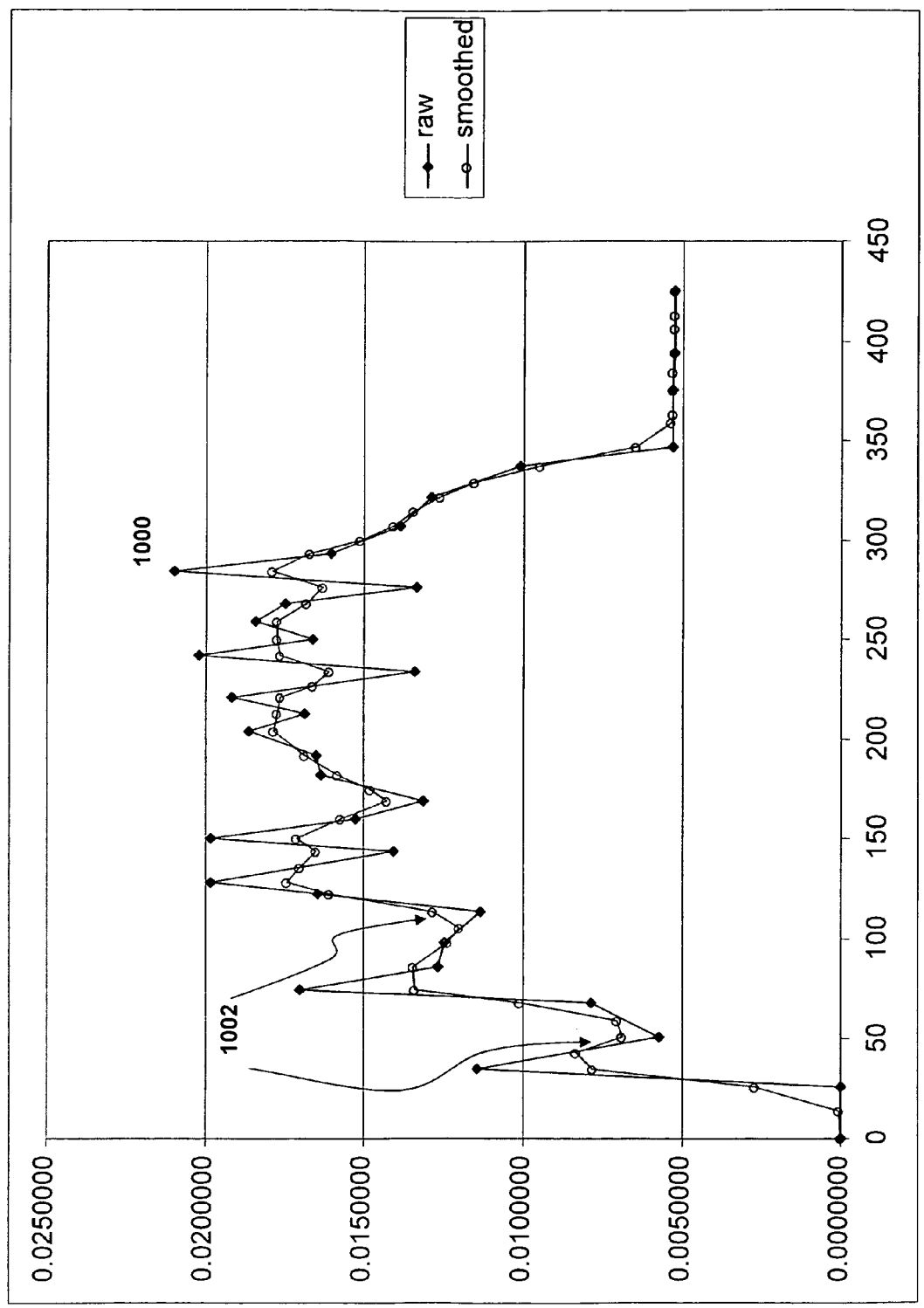
FIG. 10 shows approximate Gaussian smoothing of curvature values.

In one embodiment, the Gaussian curve is simplified—the Gaussian values are approximated by sampling at various sigma intervals near each captured shape point position, such as +−4$\sigma$, +−2$\sigma$, and shape point position itself—and connecting these with straight lines. Wherever any two shape points are within 4$\sigma$ of each other, those samples and the midpoint between them are calculated. FIG. 9 highlights a ramp 900 to be analyzed, with traversal indicators 902 to guide the reader to interpreting the graph of FIG. 10 as it relates to traversal of ramp 900. FIG. 10 shows the jagged raw curvature data 1000, and its smoothed approximation 1002. The extremes of the shaping artifacts are quite smoothed, while the characteristic curve remains clear.

Other embodiments to this invention may involve smoothing the curvature function by means other than Gaussian weight. In particular, a smoothing function popular for its simplicity is the triangle filter, so-called because its sensitivity graph around a point x with aperture d can be visualized as a triangle with a value of zero at x−d and x+d, peaking at a value of 1/d at x. In other words, its value at a point x is $(\int f(x_1) * (d-|x-x_1|))/d^2$, integrated from $x_1=x-d$ to x+d. Another simple smoothing function is the square filter, in which the sensitivity is a constant 1/2d x−d and x+d, thus having a value at point x of $\int f(x_1)/2d$, integrated from $x_1=x-d$ to x+d. These filters and many others can be applied as part of this invention, and may further benefit from the computation-saving concepts described in Appendix A2.

8. Curve Fit

The clothoid spline in curvature space is now smooth and amenable to simple regression analysis for curve fitting. This can be done by recursively applying a regression technique such as first-order (linear) least-squares fit. Working in curve space provides a way to quantify and limit the amount of error that is generated in the fitting process.

One embodiment recursively applies first-order (linear) least-squares fit to the Gaussian smoothed curve, to generate a piecewise linear function as follows. A listing in c++ is included, providing an easy means to generate a correct first order least squares line for any piecewise linear curve such as the curve being processed.

The recursive routine returns a piecewise linear function. The function will operate over the whole of the length of the curve, or over some subset (termed "the subset").

The method first tries a single-piece least-squares linear fit function (f'), which can be calculated using the computer code of FIG. 23, to match the smoothed curve function (f) within the subset. Acceptance is determined by measuring the standard deviation, weighted by the length (d) of the subset, a formula of:

$$E = d * \sqrt{\int (f'-f)^2}$$ 
Equation 2—Length-weighted Standard Error

If E is greater than a preset maximum, the calculated linear function is insufficient to meet the error criterion, and the system recurses as shown below. If E is acceptable, then the calculated function is returned.

The system recurses by finding a pivot point at which the subset can be bifurcated. In one embodiment, the point in the subset at which the smoothed curve function varies most from a straight line drawn between the subset's endpoint values is chosen for a pivot. This so-called pivot point becomes the end point for a new "first" subset, and the start point for a new "second" subset. The system recursively retrieves the best piecewise linear functions for these subsets.

One final resolution is necessary before joining the two piecewise functions (for example, f1 and f2) at the pivot point: f1(pivot) and f2(pivot) undoubtedly return different values. The two piecewise functions must be modified to make a proper spline. The pivot-point value for the merged function will be assigned a common value based on the distance-weighted mean value of the two pieces of each which touch the pivot point. That is, the value at the pivot point is assigned to:

$$Equation\ 3 = (d1 * f1(pivot) + d2 * f2(pivot))/(d1+d2)$$ 
Merging Piecewise Linear Function in which d1 and d2 are the lengths, respectively, of the linear portion of each function that touches the pivot. This distance-weighted calculation for the pivot point has the notable characteristic of maintaining the same area in the fit function as that of the piecewise linear function undergoing fit. Since summed function area in curvature space is directly proportional to geographic heading change, this characteristic accumulates no overall heading error and thus minimizes error in general, as will be discussed further.

Figure 11A:
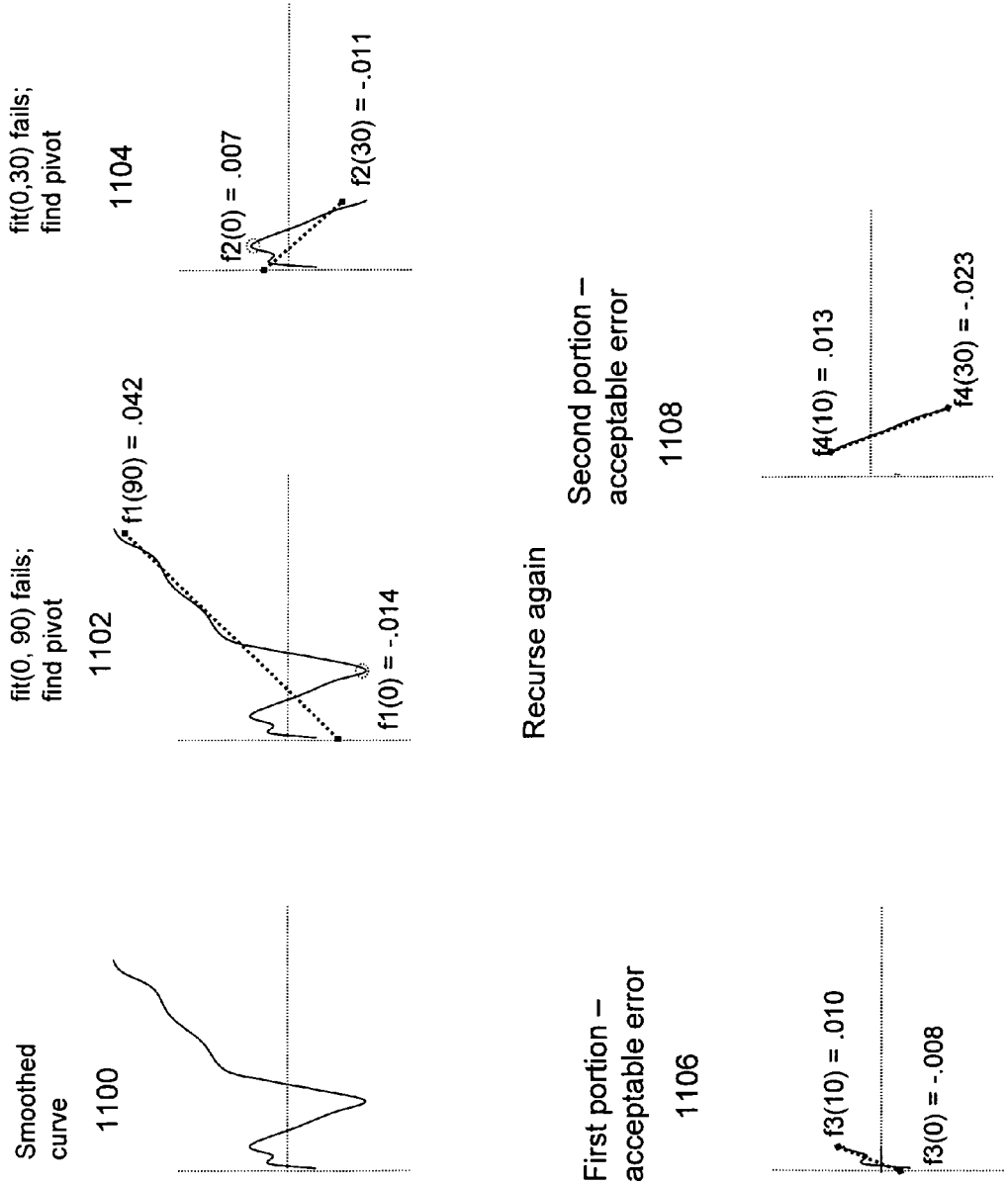
FIG. 11 shows generating the piecewise curvature spline function.
Figure 11B:
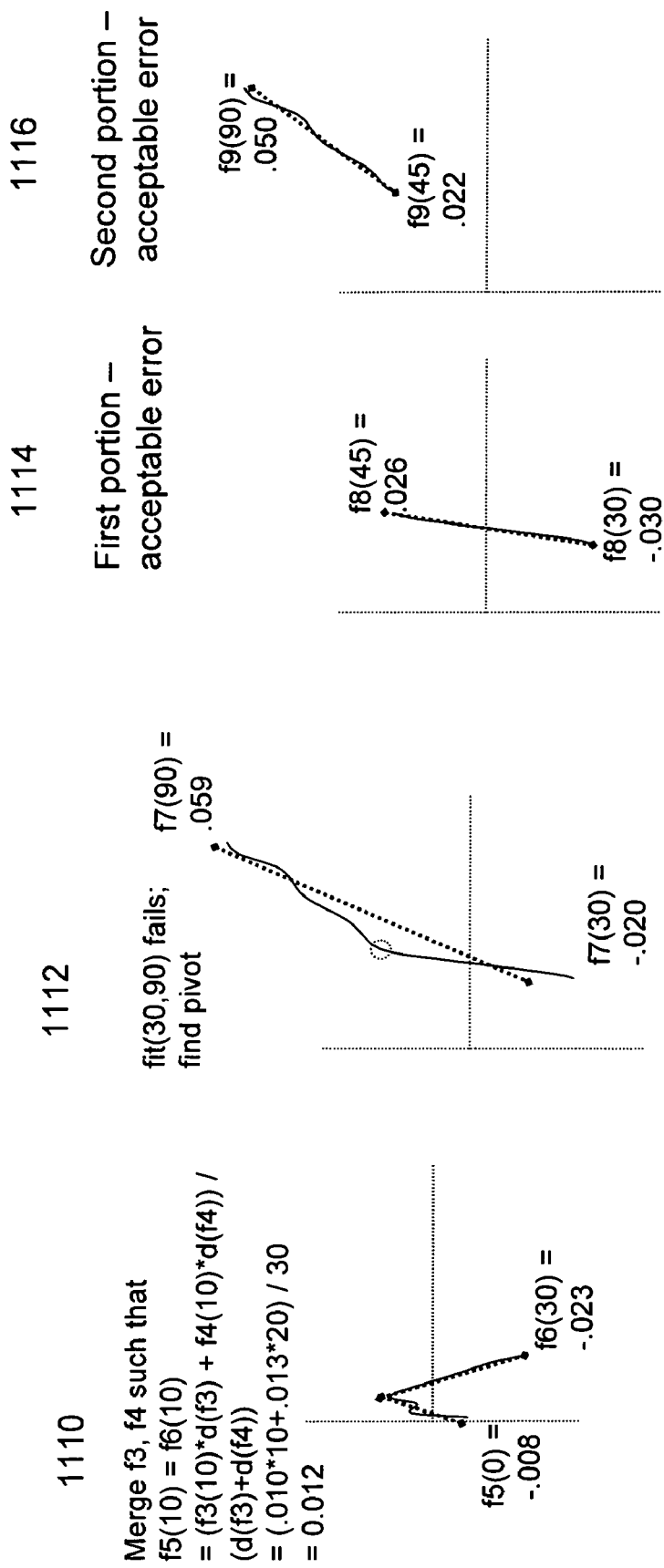
Figure 11C:
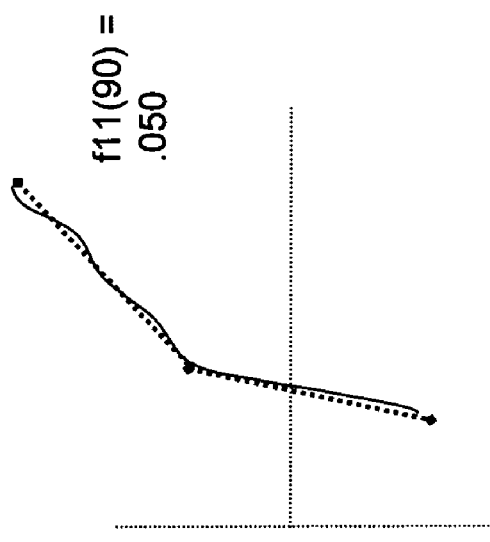

With the pivot point value resolved, the two equations can be joined. FIG. 11 shows a simple example operating along 90 units of distance. For the purpose of clarity, each piece of each intermediate generated function has been labeled with a unique identifier; in actual practice, any method or software algorithm that models piecewise functions may be used, and the pieces themselves need not be distinct, other than for the purposes of determining length.

The numbered exhibits of FIG. 11 illustrate successive steps in using this recursive approach in discovering a good function fit. Exhibit 1100 illustrates a sample curvature against traversal graph of some geometric shape. In Exhibit 1102 the first step of the invention attempts to generate a single least-squares match for the function, illustrated as the dotted overlay f1. The error value of this function, compared to the original, fails to meet the set threshold. The process must calculate a pivot point, illustrated by the encircled pivot point in Exhibit 1102, which is the furthest point in the original function from an imaginary straight line connecting its endpoints. Exhibit 1104 illustrates the next step—the attempt to generate a fit to the function between the origin, to the pivot found in 1102, with function f2. This function fit also fails to meet the error threshold, resulting in the need to again find a pivot point, this time the point on the visible portion of the original function which is furthest from an imaginary straight line connecting its visible portion endpoints. Exhibit 1106 illustrates the next descent into function fitting, but at this stage the function fit f3 meets acceptable error and is retained for later stages. Similarly Exhibit 1108's function fit f4 meets acceptance standards. Merging occurs, as shown in Exhibit 1110, to reconcile these two function values at the pivot point they share, the pivot that had been calculated in 1104. Exhibits 1112, 1114, and 1116 are similar to 1104, 1106, and 1108 in first attempting a function fit (f7) which fails to meet error criteria, and then succeeding with function fits in subsections delimited by the pivot point found in 1112. Exhibit 1118 reconciles the values of functions f8 and f9 at the pivot that had been found in 1112. The final step of Exhibit 1120 reconciles the values of the derived piecewise functions of 1110 and 1118, at the pivot point that had been found in 1102. The result is the four-piece linear function fit shown in 1120 as an overlaid dotted line.

Figure 12:
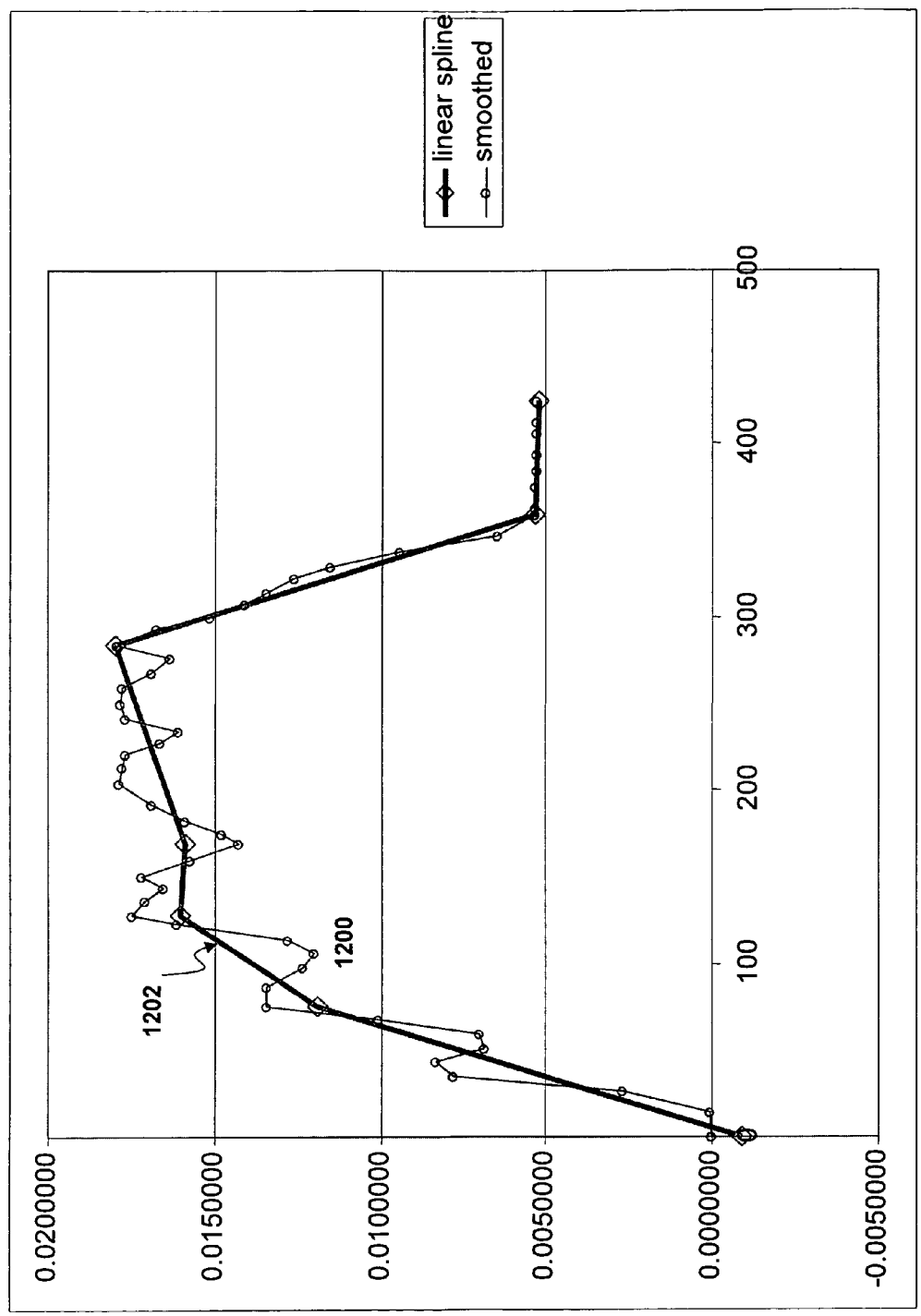
FIG. 12 shows a calculated piecewise curvature spline function.

FIG. 12 is an actual resolved linear function for the road in FIG. 8. Function plot 1200 is the smoothed Gaussian approximation of the curvature—the same function as illustrated in 1002 of FIG. 10. Function plot 1202 is the result of the preceding recursive function fit process applied to that Gaussian approximation.

9. Apply Straight Line and Curve Affinity

One embodiment of this invention as described above facilitates remarkably accurate discovery of straight line and arc sections of a path. Thus one can determine which portions of a geometric curve may be represented by straight lines (curvature zero), or by arc segments (constant curvature), rather than by the actual least-squares regression results. Such determination may be advantageous if, as in the case of many roadways in most countries, the real-world features themselves are designed to use such shapes wherever possible. Said determination may be used as information within client systems to improve line-of-sight calculations, optimize steering tracks of automated vehicles, or simply as a means to lower the computational overhead of interpolating curvature for other purposes. Said determination may be delivered as a separate product, or may be used to generate new parametric values that will replace the initially calculated values altogether.

In the discussion below, it is convenient to describe one embodiment as replacing the initially calculated values. It can be seen that other scenarios, for example delivering one or more alternative functions using varying levels of straight line and curve affinity in addition to the basic curve fit, are possible. Therefore the replacement terminology is illustrative and not intended to limit the scope of the invention.

One embodiment searches for opportunities to replace endpoint values in the piecewise function, subjecting each proposed change to two error formulas: the distance weighted error value (E) from Equation 2, and an absolute value of accumulated error, or:

$$E_{(a)} = \text{Equation 4—Formula for Absolute Value of Accumulated Error } (E_{(a)})$$

The latter value, $E_{(a)}$, is quite important because absolute error is directly proportional to the angular error that may be introduced by the parameter replacement being considered.

Each function value replacement proposed in the techniques below, whether it is a single point replacement, or the replacement of a contiguous section of the function, must undergo this error test. The function section prior to the replaced value(s) must continue to meet the criteria; the function section immediately following the replaced value(s) must continue to meet the criteria; and in the case where a contiguous section is replaced, that new section must meet the criteria. When all these criteria are met, the replacement is deemed of sufficient quality to be taken.

One embodiment iterates along each section of the already calculated piecewise function, trying to fit it and as many successive sections as possible into a single constant valued function. For each section i, calculate the mean value of the original function, that is, $$V_{(m)} = (\int f(x) dx)/d \quad \text{Equation 5—Mean Value over Distance } (V_{(m)}) \text{ of Function f}$$

in which d is the total distance covered. Attempt to replace both endpoints of section i with $V_{(m)}$, applying the error criteria to this section, the preceding section (i−1), and to the successive section (i+1). If all affected sections are within the maximum tolerance, this replacement is acceptable. Attempt to aggregate adjacent functional sections by repeating this process with a combined section consisting of this section and the succeeding section (i+1). Continue adding successive sections until the proposed replacement fails. The most recent viable replacement for a contiguous group of sections is considered a successful constant-value function replacement.

When a successful constant-value function replacement is identified, also check the error criteria for a replacement function with a constant value of zero instead of $V_{(m)}$ for the new function section. If a zero value meets the tolerance for all affected sections, use the zero value as the new function section endpoints; otherwise they should be set to $V_{(m)}$. After performing this successful constant-value function replacement, advance the iteration to the next unchecked function section.

In a further refinement of this method, a successful section replacement is followed by successive attempts to push its endpoints yet further. Iteratively attempt to advance the beginning point or the ending point of the flat line section respectively to the location of the previous or next sample point. If the successful constant replacement value has not been forced to be zero (representing a straight geographic line), it should be permitted to "float" to the $V_{(m)}$ of the newly proposed expanded section. Calculate the error criteria for all affected sections; if they succeed, the advancement is considered viable. Continue until neither the beginning point nor the ending point of the flat line section can be expanded to a viable flat line, and accept the last successful advancement endpoints and the calculated constant value for that section.

The affinity logic is also applied to successive points between the linear function sections, and to the beginning point and endpoint of the functional fit. In a manner similar to the one used for replacing sections, any individual point may be replaced by zero if the two functional sections affected, the section before that point and the section after that point, remain within the error criteria following such a replacement.

Figure 13:
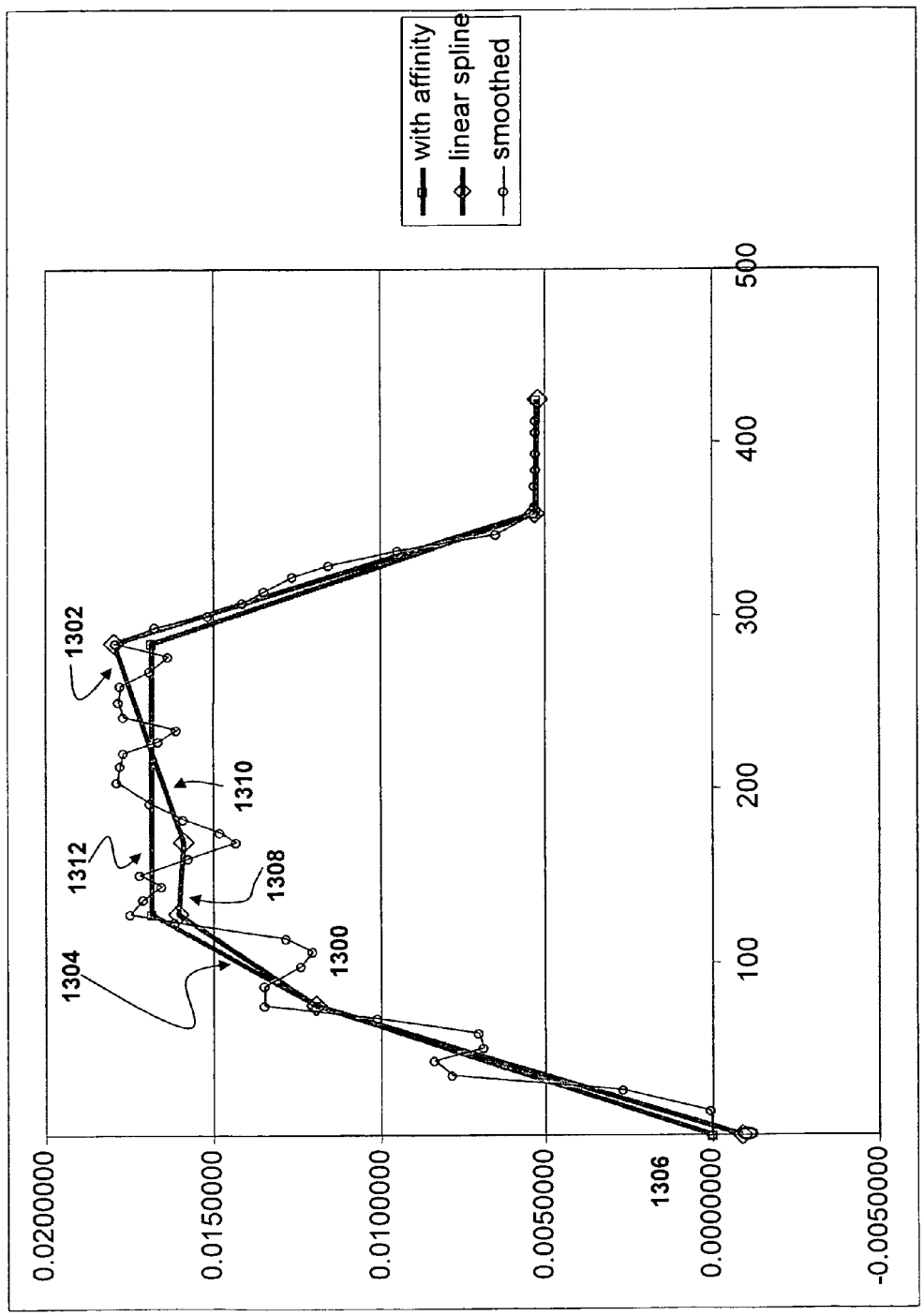
FIG. 13 shows a calculated piecewise spline with curve affinity applied.

FIG. 13 again shows the original smoothed Gaussian approximation to the road 900 in FIG. 9, as plot 1300; and it shows the linear spline generated from it using the function fit process, as plot 1302. Plot 1304 shows the affinity model applied to 1302. The first point of function 1302 has been successfully modified to zero, shown at point 1306, and two adjacent sections of 1302, labeled 1308 and 1310, have been successfully replaced with a single constant curve section labeled 1312.

Figure 14:
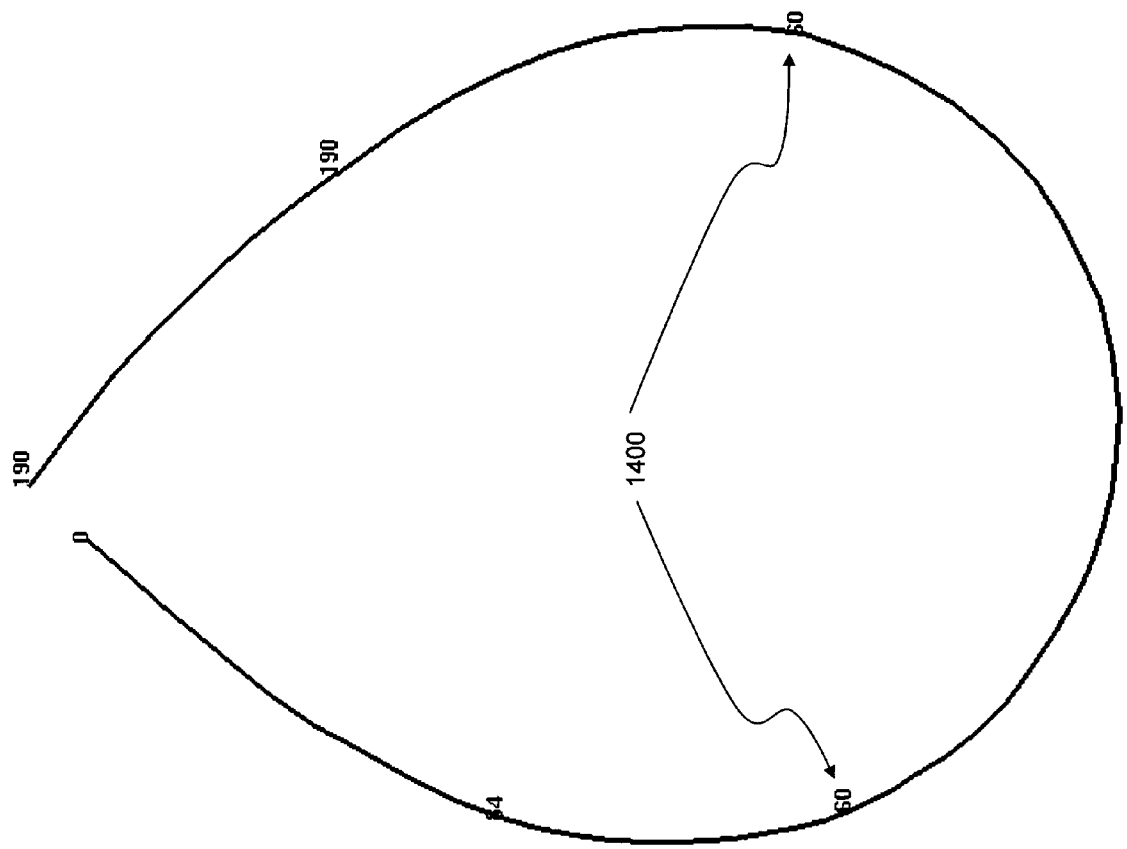
FIG. 14 shows the analyzed road with radius indicator annotation.
Figure 15:
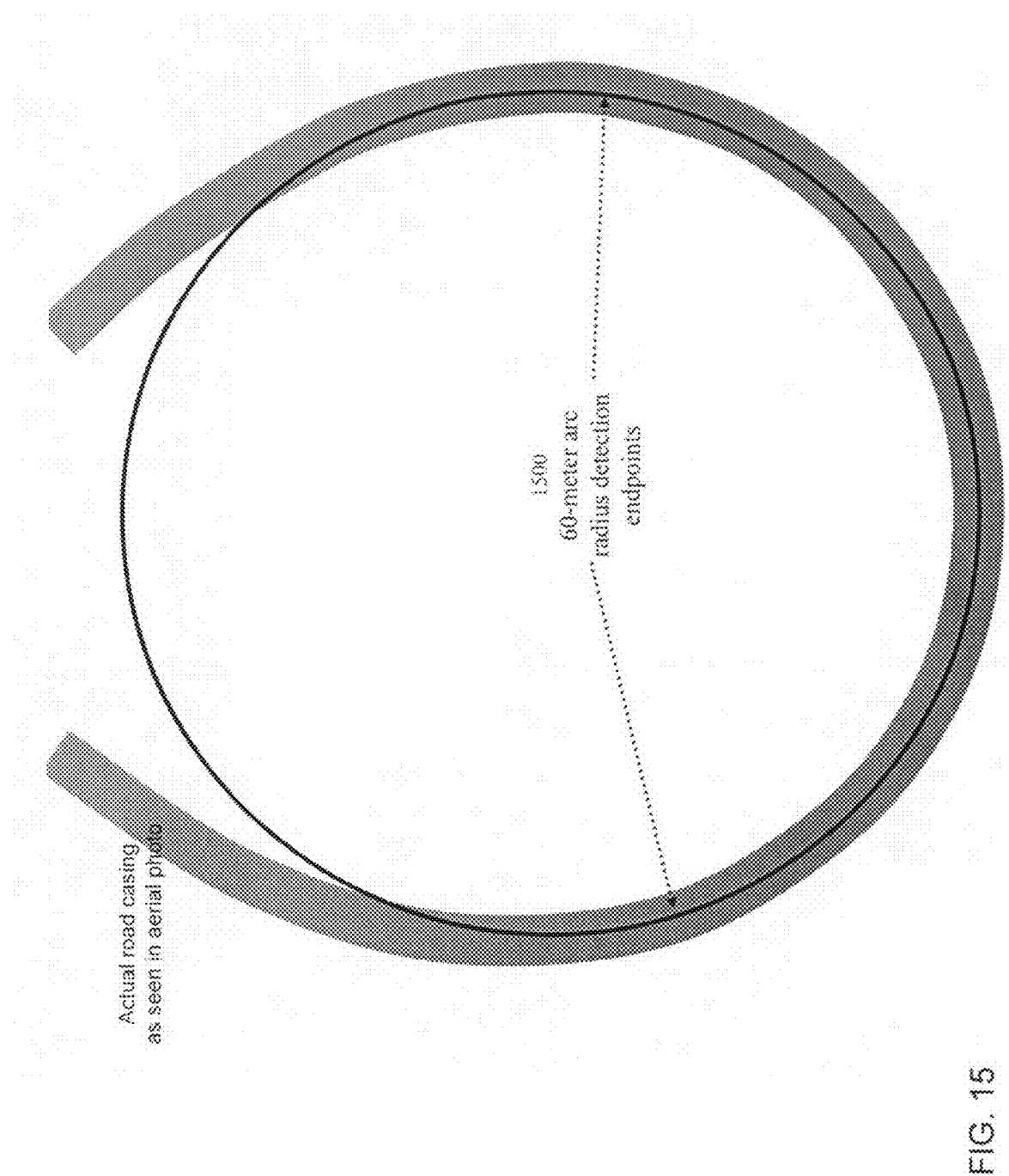
FIG. 15 shows annotated ramp, 60-meter circle, and 60-meter detection endpoints superimposed on aerial photograph.

FIGS. 14 and 15 show the road that was used for this illustration, in isolation from other features. For illustrative purposes, the road has been annotated with the radius of curvature (which is the inverse of diopter) to indicate the high fidelity of the results. The straight line 1312 from FIG. 13 directly relates to the region of detected constant curve with radius of 60 meters denoted by the end annotations marked 1400 in FIG. 14, and consisting of those points and the roadway between them. Zero is used to indicate no curvature (undefined radius). The zero marking, 1402, relates to the zero affinity point 1306 in FIG. 13, and is a reasonable representation of the ramp's flattening to a straight roadway at that point.

FIG. 15 shows this road using aerial photography, with a thin circle of 60-meter radius drawn coincident with the 60-meter circular arc endpoints (1500) detected by this invention. The image demonstrates the highly accurate discovery of both the radius and the extent of a circular subsection within the road's centerline path, matching the imagery well despite the intrinsic error of the original line segment database.

10. Setting Error Tolerances in Conversion

Operation in curvature/distance space, and the simplifying representation of the Gaussian smoothed curvature profile as piecewise linear functions, provide for control of the conversion error introduced during the process.

In so doing, one embodiment provides a robust conversion that eliminates the noise inherent in the relative inaccuracy of the original line segment data, while maintaining the fidelity to the real-world shapes it intends to represent. Said another way, this embodiment provides an environment in which shape fluctuations within the relative accuracy range of the source data will have a zero or negligible impact on the results, yet an optimal recognition of differentiating shape is obtained. The Gaussian smoothing sigma should be three to four times the relative accuracy; in addition, the error tolerances for function fitting and affinity models can be appropriately derived.

The overall heading error can be set to zero, and the upper bound in positional error will be shown.

One embodiment limits heading error between curvature-based representation and shaped line representation. Heading error is defined as the instantaneous heading difference between a curve based on the clothoid parameters, compared to some plausible curve generated from the shaped line itself. In one embodiment, the overall heading error generated by a least squares curve fit of any standard deviation E over distance d is zero because any least squares curve will pass through ($x_{mean}$, $y_{mean}$)—thus the sum of curvature will be equal between least squares fit and the original function. Similarly, the use of Equation 3 to force common endpoints between the piecewise least squares result sections also holds overall orientation error to zero. Therefore the only overall error in heading is produced by the affinity models. These errors are bounded solely by the choice of E and $E_{(a)}$.

Alternative Embodiment: Straight Line Affinity with Zero Accumulated Heading Error In fact, the overall orientation error within the affinity model can be held to zero by adjusting Equation 5's mean calculation with a calculation that instead maintains the area under or over the curvature function. Since the sum of area under or over the curvature function is directly related to heading change, no change in area means a net heading error of zero. With values as indicated in FIG. 15, simple equation solving can show that a replacement of v1 and v2 with:

$$v = (a*v1 + 2b*\text{mean} + c*v2)\text{Equation 6}: \text{ZeroError Flat Line Substitution}$$

will have the same overall curvature as the original approximating function. In this alternative, the accumulated error, $E_{(a)}$ need not be determined; it is precisely zero.

Figure 16:
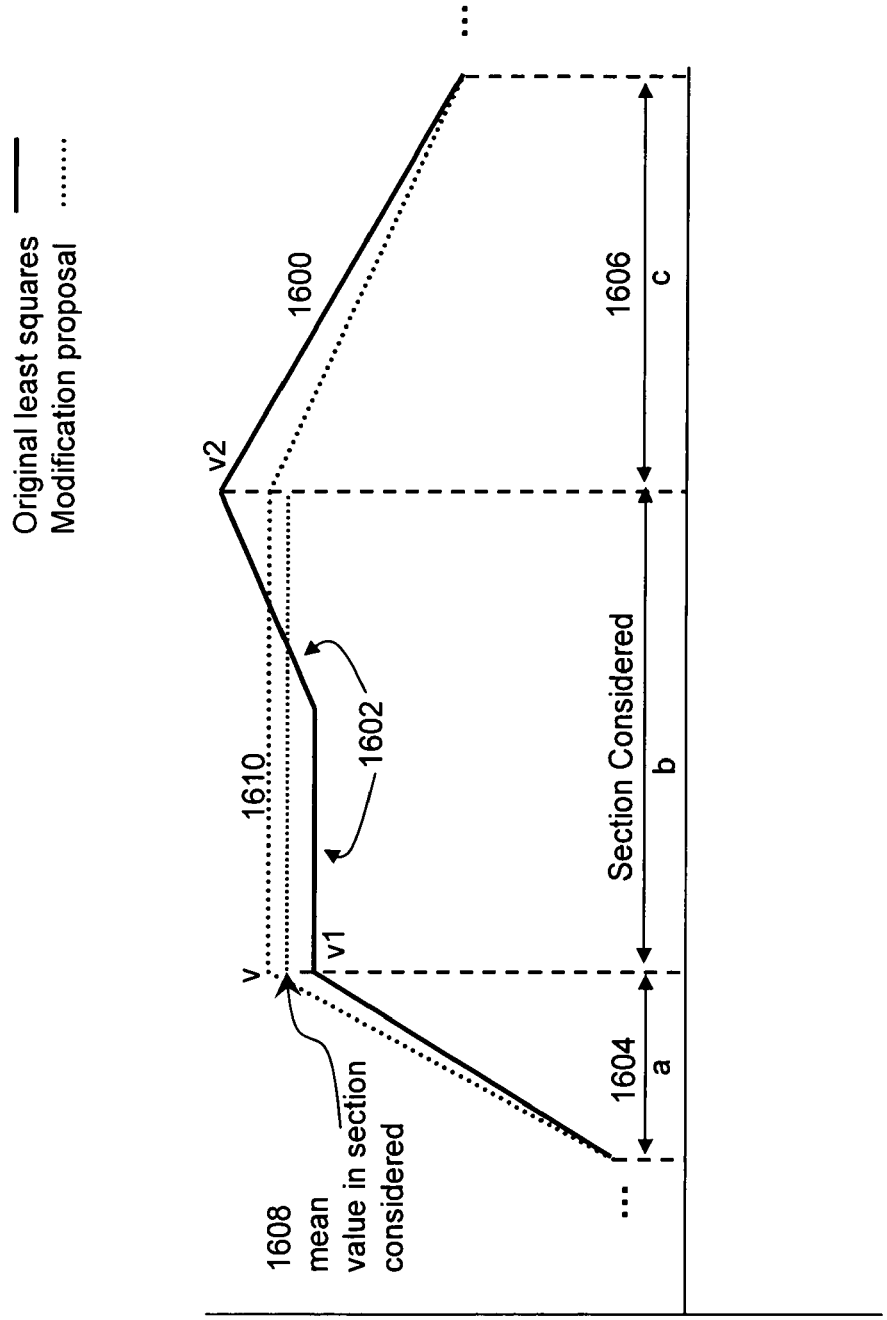
FIG. 16 shows using least squares curve fit lengths to calculate a zero net effect latitude value proposal for a section.

FIG. 16 illustrates a specific example: in this case a fitted function 1600 is analyzed, with a function section consisting of two adjoining pieces, 1602, to be considered for straight-line replacement, and having length b in the equation above with endpoint values of v1 and v2. Section 1602 is surrounded by function pieces before and after, with x axis extents marked as 1604 with length a and 1606 with length c, respectively. A mean value 1608 for section 1602 of function 1600 has been calculated. The calculation of equation 6 yields the value v as shown, leading to the proposed replacement function 1610 and having no net area change compared to function 1600.

Note that the use of zero affinity is not readily provided in this alternative; only flat-line affinity, related to the detection of circle segments, is available. Nonetheless, flat lines that had been detected in the find corner interfaces will remain flat.

Finally, with overall accumulated heading error at zero, the only source for positional error is the cumulative effect of instantaneous heading variance. This effect is proportional to the value of E permitted in building the least squares fit, times distance; however, since distance was used as a denominator in the error criteria, distance error can be bound to a constant within each section of the curve.

11. Reshaping or Enhancing Database Geometry

One embodiment has a simple clothoid-to-shape line reverse conversion to smooth and beautify existing shaped line chains. Reverse conversions, available in prior art, can be used to provide the optimal minimum number of shapes to adhere to a desired distance tolerance of the clothoid characterization. That is, in cases where shaped line data is the desired mode of delivery, the clothoid curve characterization as shown above can be used, with a reverse conversion, to reposition internal shapes on lines and deliver the results with a minimal number of shape points as needed for the desired application's precision.

Given that some level of conversion error is inevitable and in fact desired in order to eliminate relative accuracy artifacts, it may be necessary to take the raw results of a reverse conversion, and transform the results to meet the original shaped line at strategic intervals. In an embodiment of this technique, the steps to generate such a function from a reverse transform (R), such that its standard deviation remains less than a threshold (T) from an original chain (C), are described as follows.

Find the furthest non-endpoint of chain C from both ends (that is, such that the smaller of distance (pt, C.front), distance (pt, C.back) is greater than that for any other point).

If distance (C.front, C.back) is less than ½ the distance determined in step 1, bifurcate C at the point discovered in step 1, split R at a proportional point, and perform again for both halves.

Let R' be an affine transform of R such that R.front equals C.front and R.back equals C.back. Check the standard deviation distance between C and R. If greater than threshold T, bifurcate C at the point discovered in step 1, split R at a proportional point, and perform again for each half. Otherwise, R' is the desired result.

Join the generated chains. They are all now within the distance tolerance (T).

Figure 17:
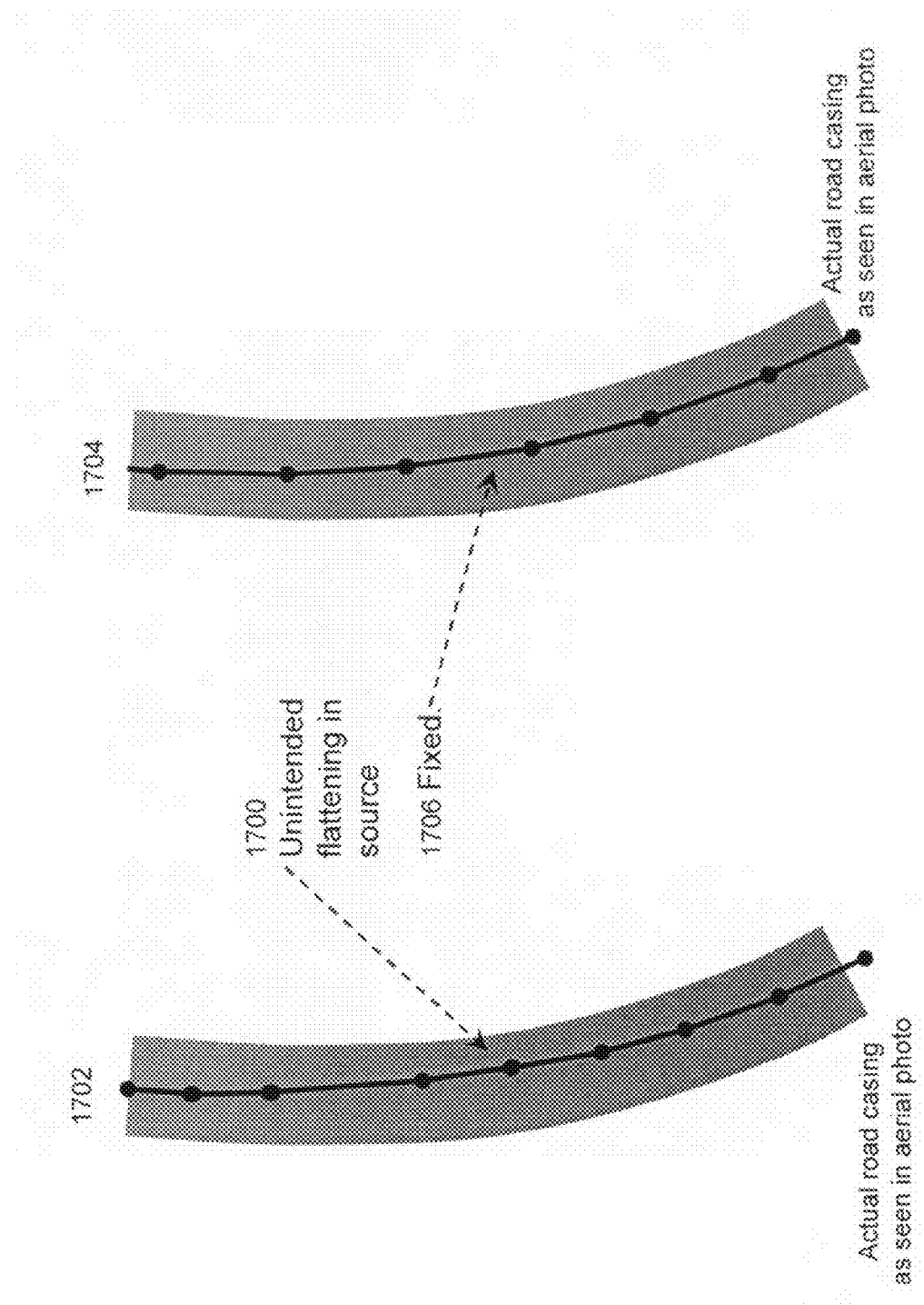
FIG. 17 shows an example where reshaping removed subtle relative accuracy jitter.

In the ramp example shown in the previous illustrations, subtle relative accuracy jitter is removed. FIG. 17 shows one such location in the curve where this can be observed. 1700 illustrates this location of jitter along an existing shaped centerline 1702. Shape line 1704 is the result of conversion to clothoid and conversion back to shaped centerline. It can be seen that a smooth arc, particularly at location 1706, has improved the road's shaping.

Figure 18:
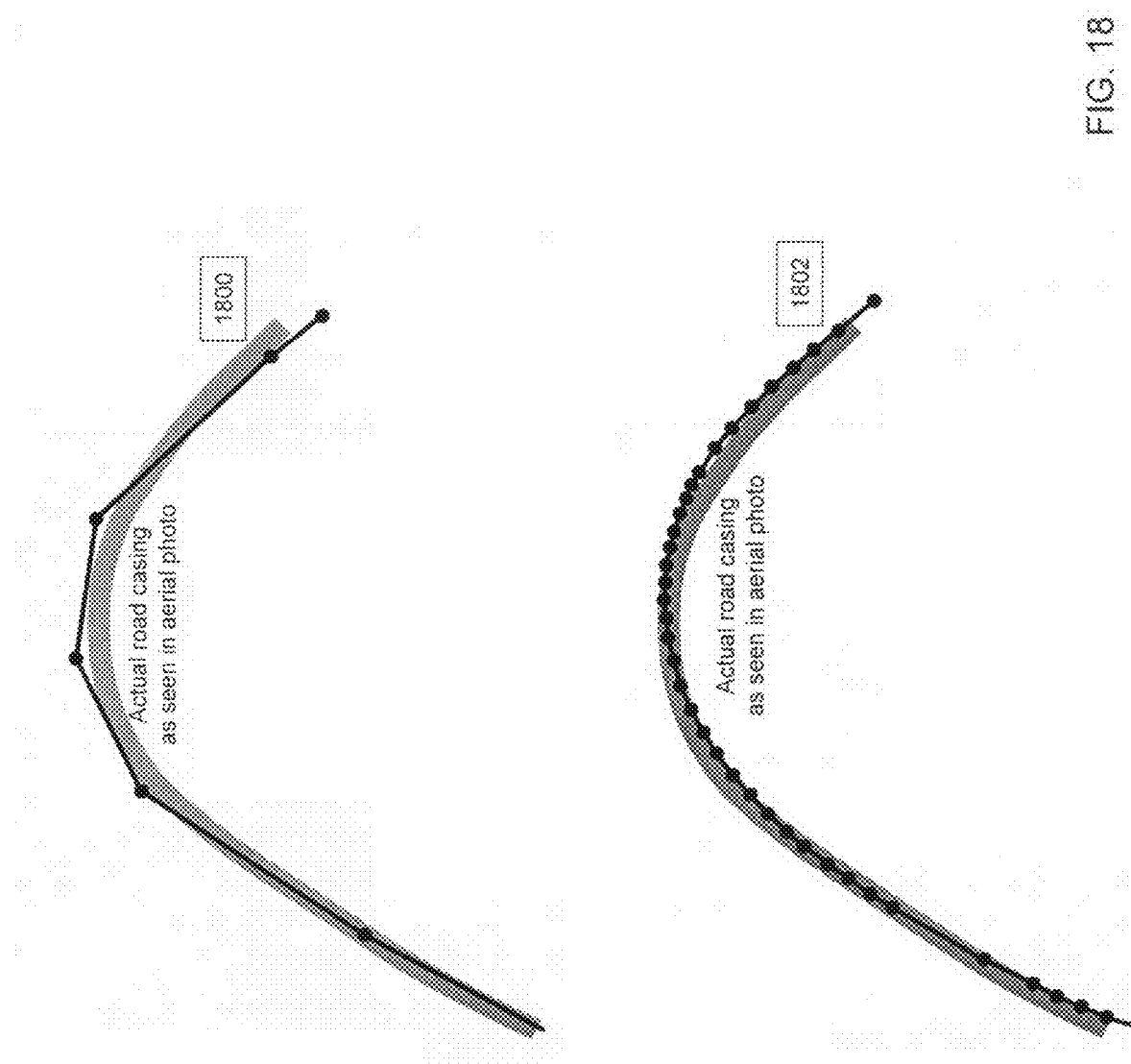
FIG. 18 shows reshaping a low quality shaped line.

In other cases, where the original line segment data is of lower accuracy, as shown in FIG. 18, image 1800, a reshaping using the technique described produces the chain shown in image 1802. The new chain adheres remarkably well to the actual orientation of the feature. It would generate curvature information of high quality despite the poor original segment. In such a case either the original data may be replaced by the reshaped line, or the data delivered for certain uses might contain the replacement.

FIG. 18 shows such a case, in which a segment 1800 of the original data is replaced by 1802, the conversion to clothoid and conversion back to shaped centerline.

12. Generating Reasonable Approximations to Design Specifications

It is often useful to generate circular and clothoidal parameters for curves as a reverse-engineering process to build a reasonable approximation of original roadbed design. Such a process can be used to annotate "as built" drawings or to add further value to a geographic database. When design drawings are available, the circular and clothoidal output generated from the process can be compared against original drawings, such that nearly identical values can be used to verify the database and drawings against each other. When significantly different values are encountered, they may be used to identify as-built discrepancies; locate issues in the underlying database, such as faulty geographic registration or data capture flaws; identify modeling differences that affect the road centerline, such as a road widening or lane configuration change; or identify transition zones that were previously unnoticed.

Figure 19:
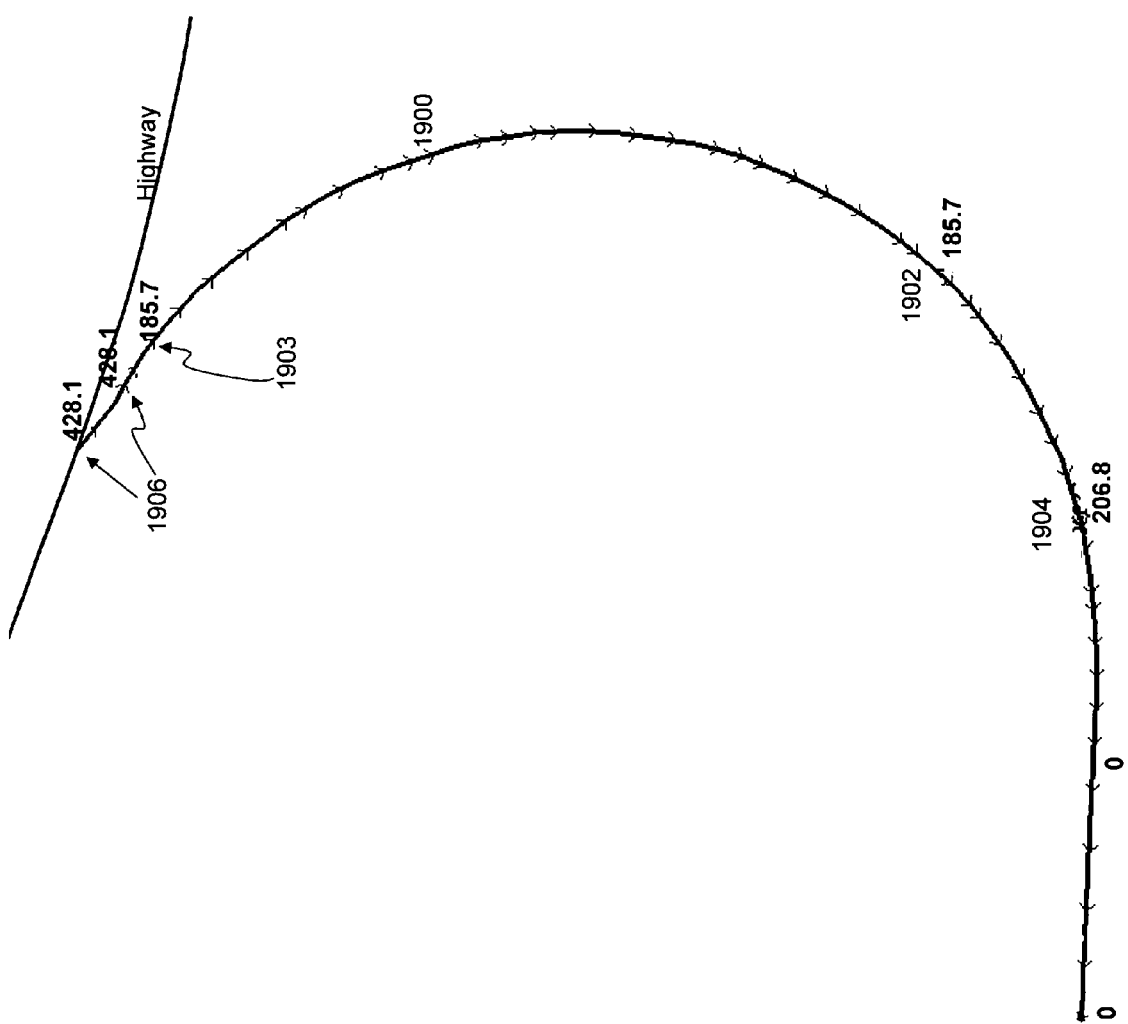
FIG. 19 shows a database ramp annotated with generated curvature values.
Figure 20:
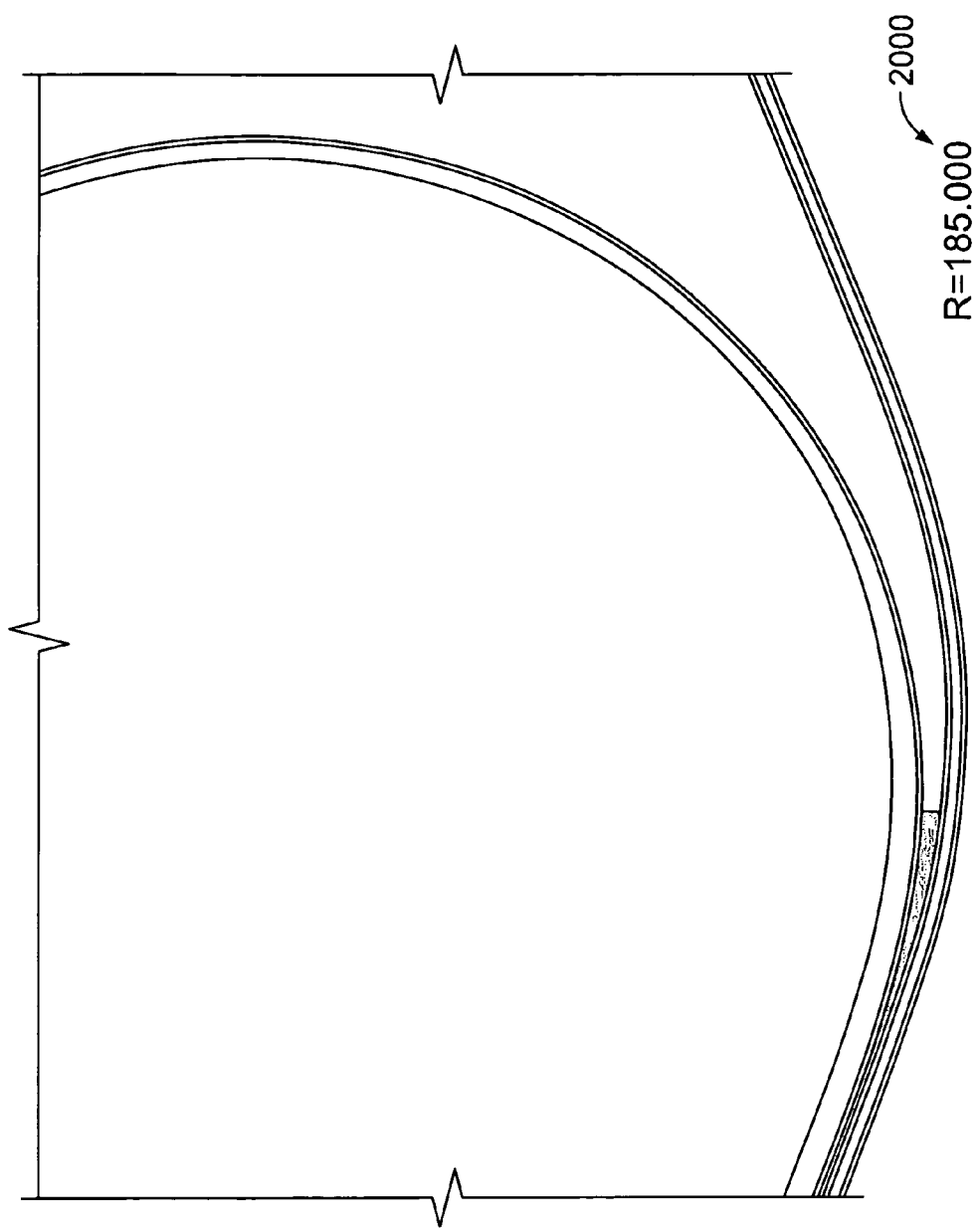
FIG. 20 shows the design drawing of the southern portion of the database ramp.
Figure 21:
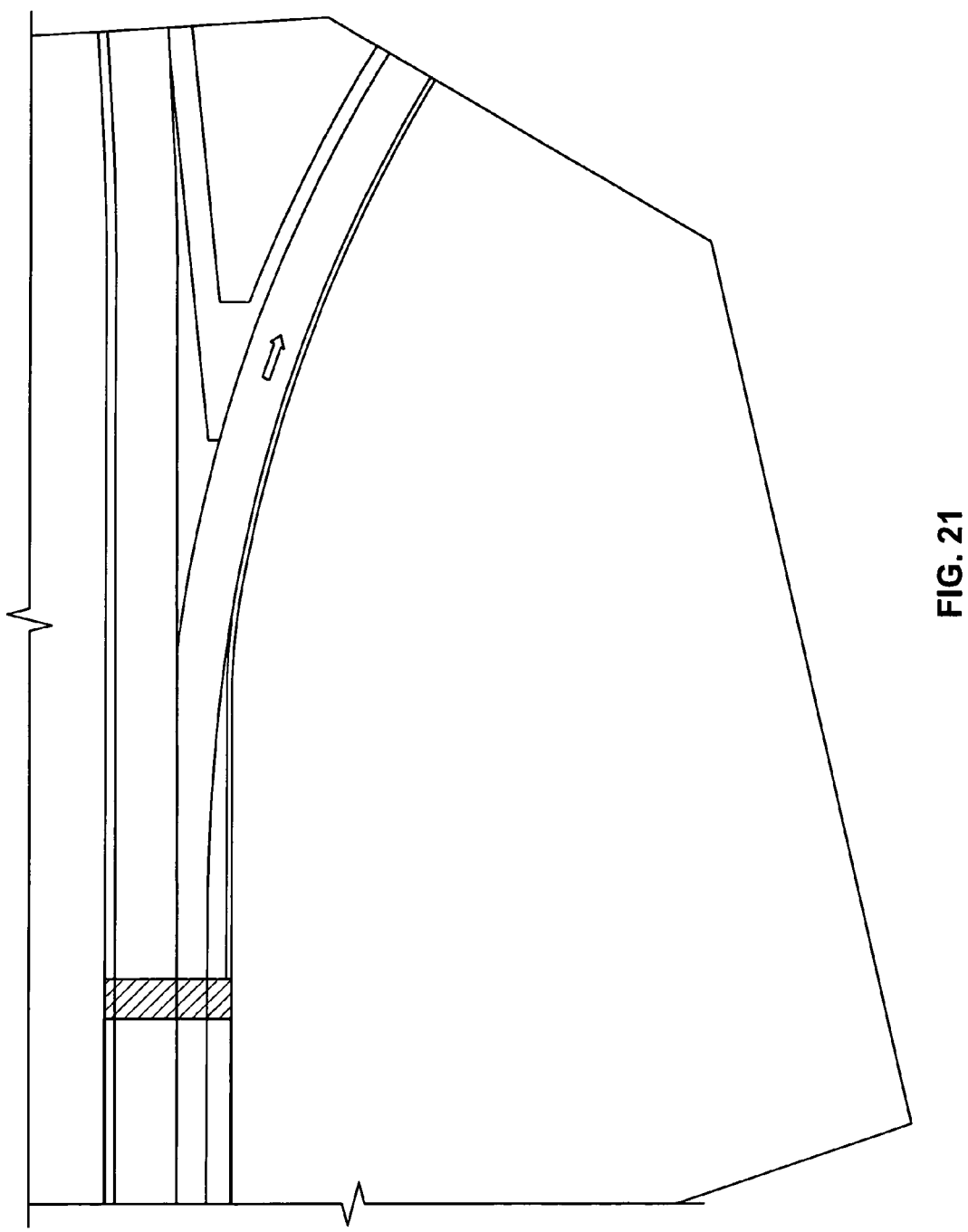
FIG. 21 shows the design drawing of the northern portion of the database ramp.

The application of such cross-checking is illustrated as follows. FIGS. 19, 20, and 21 show a ramp and the design drawings for that ramp. In FIG. 19, annotations 1902 and 1903 on ramp 1900 indicate that the ramp's radius has been identified as a constant 185.72 meters between those points. Comparing with FIG. 20, which is one page of the design specification for the same ramp, the surveyor specified a 185.000 meter radius of curvature (2000). Thus, the identified radius matches the ramp's design specification of 185 meters with an error of |185.72−185.0|/185.0, or under 0.5%. This cross-check and the low error yields a high degree of confidence that the ramp between these points is represented accurately.

Figure 22:
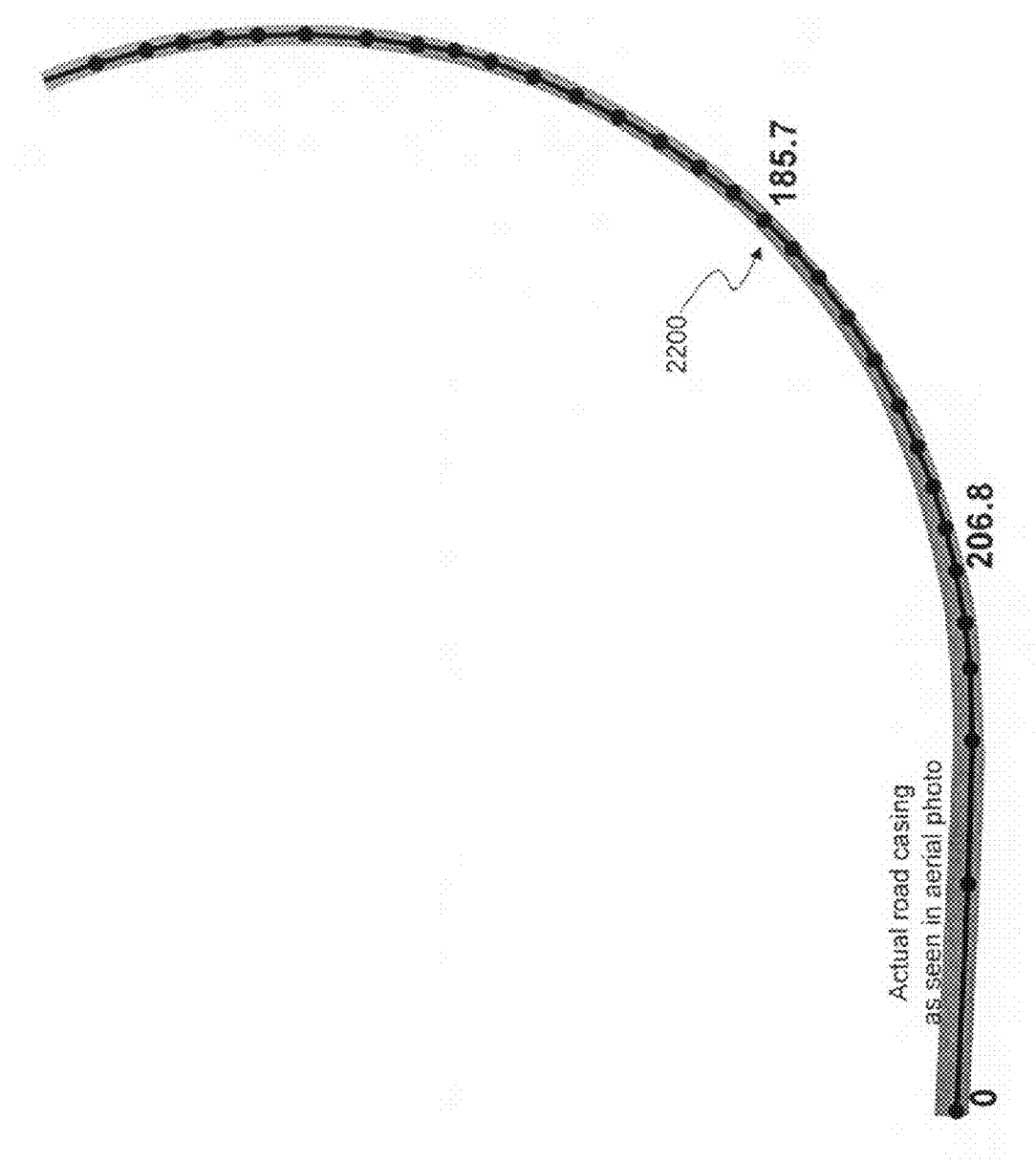
FIG. 22 shows a photograph of the ramp described in FIG. 19, FIG. 20, and FIG. 21.

Although the endpoints of the identified radius are generally correct, the southern endpoint is short, with a brief transition clothoid to an arc of about 20 meters wider, seen by the notation 1904 in FIG. 19. This short shape transition is not reflected on the design document; however, review against photography (FIG. 22) shows that this is the precise spot, indicated at location 2200, in which an additional lane appears, widening the ramp. Furthermore, in this region of the ramp the vector representation hugs the outer edge of the curve instead of remaining central. The design document itself indicates a 90-meter taper zone for this lane, correlating closely to the region identified between point 1902 and 1904.

The cross-check of the clothoid spline against design document thus has revealed an aspect of the road and of its database representation, which might be of interest either to the customer or to parties validating the lane modeling and positional accuracy of the database.

At the northern end of the ramp is a transition zone between ramp and highway. The context for this ramp was purposefully removed when running the invention, in order to show the means of identifying such an error. Notations 1906 indicate a radius that is not supported in the second design drawing of FIG. 21. According to that design document, the curve should gradually transition to a straight line, but instead notations 1906 indicate a rather sudden turn. Thus, the cross-check with design documentation highlights the missing transition zone context, allowing the error to be found and corrected.

13. Generating Data Files for ADAS and Other Uses

The means of this invention may be used to generate data files or database tables that describe paths as clothoid splines. This may be useful in the case where the original geometry is desired for display or other uses, but the curvature value is also needed.

One such method would be to populate a file or a database table with text or binary rows of data representing at least each segment endpoint and each transition point in the clothoid spline. Each row of data may contain a segment identifier, a distance or proportion along that segment, and a curvature value expressed as either radius or diopter. Coordinates, the x and y position for each, might optionally be included as well. One sample table is shown below, using the parameters shown in FIG. 13, for the ramp in FIG. 14. In this case, the geographic segment identifier is 72053.

TABLE 1

| ID | Offset (m) | Radius (m) |
|---|---|---|
| 72053 | 0 | 0 |
| 72053 | 69 | 84 |
| 72053 | 129 | 60 |
| 72053 | 288 | 60 |
| 72053 | 357 | 190 |
| 72053 | 422 | 190 |

The sample representation shown above uses radius instead of diopter for better human comprehensibility. However in this case the process must encode straight lines which have an undefined radius with a special value; in this case, zero. This sparse data allows any reading device to linearly interpolate, using the two nearest enclosing captured values, in order to arrive precisely at the function's curvature for a given point along the path. Thus to report the curvature for the point 100 meters past the start of segment 72053, a device should calculate that curvature by linear interpolation as ((129−100)*1/84+(100−69)*1/60)/(129−69), for a curvature of 0.0144 diopter or a radius of 69.6.

Another means of storing or transmittal for curvature might include providing arrays of (x, y, [z, . . . ], c) values in order to enhance the typical two-to-three-or-higher dimensional coordinate data points delivered with a geographic database—that is, inserting an extra value representing the instantaneous curvature at each shape point.

In addition to these methods, many other techniques can be used to transmit or convey the curvature data and should be considered within the scope of this invention.

Appendix 1—Listings

A1.1: Generating a Linear (First Order) Least Squares Curve Fit for Any Continuous Piecewise Linear Function The C++ code listing of FIG. 23 shows a method to apply a least-squares fit to a piecewise linear function or a portion thereof.

It is efficient to store piecewise linear functions in C++ standard map (std::map) objects, in which the x and y values of each point are stored wherever linear function pieces meet or terminate as the first and second fields of the map's value objects. Accessing a single section of the linear piecewise function consists of accessing two consecutive map iterators.

A C++ object called LinearReference is used to represent all or a portion of a piecewise linear function. LinearReference provides a begin( ) and end( ) map iterator to indicate its bounded section of the function in question; it provides front( ) and back( ) to return the actual first and second (x,y) values at the extreme front and back of that section.

SlopeIntercept is a C++ object (not shown here) containing a slope and an intercept value. It can be constructed using standard algebra from any two distinct coordinates (x1,y1) and (x2, y2) in which case slope=(y2−y1)/(x2−x1), and the intercept=y1−slope*x1. This construction is used on line 27. It can also be constructed directly from a slope and intercept specification as is used on the final return statement on line 36.

In FIG. 23's listing, the least squares fit for a portion of a piecewise linear function is begun by computing several easily calculated parameters to the standard least-squares formula. The extreme x values are copied as local variables xbegin and xend in lines 10 and 11. The sum of x values is calculated on line 12; the sum of $x^2$ is calculated on line 14, and the sum of samples (for a continuous function, that is the distance in x) is calculated on line 16. These are all easy integrals so they need only be computed once. The working loop of the listing, in lines 18 through 32, takes linear section pieces in order and sums the remaining parameters, those that require the value of y. Map iterators item and next demarcate the boundaries of each section of the linear piecewise function. Average y is calculated on line 25. The integrated value of x*y is readily calculated once the slope intercept form of the function piece is known. The slope intercept form is built on line 27, and the integral on lines 29-31 is calculated. When the loop completes, it is a simple matter (lines 33-36) to apply the standard least squares formula to the numeric values, resulting in a final slope-intercept form for a best fit line.

Appendix 2—Steps to an Approximation of a Gaussian Smoothed Linear Function as a Linear Function In the curvature/distance domain, a function can be smoothed with an approximation to a smoothing function in which smoothing function samples are connected by straight line functional segments, thus maintaining an easy-to-use linear piecewise function. First, the individual Gaussian weighting approximations can efficiently be calculated in a computing system. Only certain points, at specific distances from each shape point in the original function, need be used in defining a new smoothed piecewise linear function.

A2.1: Using a Gaussian Weighting Approximation

This Gaussian smoothed value may be calculated at any point along a piecewise linear function by summing the weighted integrals of each functional section as it relates to that point. For mathematical convenience in the following description, the curvature/distance function is translated either forward or backward along the x axis, so that the point being analyzed lies at the x origin.

Each linear piece of the function has an effect on the value at the origin as indicated by the integral shown in FIG. 24 (Equation 7), the Gaussian Weighted Value for a Linear Function at Zero, in which w is the instantaneous Gaussian weight of a point at any given offset (x) from the origin; and the linear function's value (y) of such point can be represented by v, the standard slope/intercept function form. The sigma ($\sigma$) value is the Gaussian smoothing sigma referred to in section 7. Substituting the slope/intercept form and integrating w*v yields the integral function 2400.

This function is not integratible, but it can be approximated by sampling the w*v value at small increments of x over the course of that piece's length, where w is the instantaneous Gaussian weight at a particular location relative to the sample point, and v is the linear function's value. Call these increments of x the quantization interval, or q. One embodiment further simplifies these Gaussian calculations by considering all piecewise function events (beginning, end) to occur at intervals q—that is, each event location is forced to the closest integer multiple of q from the origin. q is usually related to $\sigma$; for example, q might be $0.01\sigma$. Further, one embodiment saves and reuses weighting calculation results by using the following observations:

Consider a standard normal Gaussian weighting function centered on the origin, in which $\sigma=1$. Call the distance axis G (to distinguish it from the X axis of our prior functions). Given any linear function v(G), which occurs over the interval ($g_{begin}$, $g_{end}$), such that $v(g_{begin})=v_{begin}$ and $v(g_{end})=v_{end}$. Note that the overall weighted average value v for that range bears a constant relationship with $v_{begin}$, $v_{end}$ such that:

$$v=(1-c)v_{begin}+cv_{end} \qquad \text{Equation 8}$$

for some value c between zero and one. The overall Gaussian weight of this section is also a constant, w.

Combining this concept with the quantization mentioned previously, note that one can associate a pair of c and w for any quantized Gaussian interval ($g_{begin}$, $g_{end}$). These values can either be computed a priori and stored in a lookup table, or computed only once the first time a unique interval ($g_{begin}$, $g_{end}$) is used. These stored values can be used to easily calculate the overall effect of each function section upon the Gaussian value of a given point.

The calculations are further simplified by limiting the range of consideration to a reasonable distance such as $\pm 4\sigma$, since data beyond this point contributes negligibly (roughly 0.006%).

The simplification concepts described herein yield a method and equation shown in FIG. 25 (Equation 9). A range of the linear piecewise function will be analyzed around a point in the X axis called $p_x$. A section function is constructed, which returns the section containing a given point. Using that section function, consider each section within the range of $p_x-n\sigma$, to $p_x+n\sigma$, where $n\sigma$ represents our reasonable range, such as the $4\sigma$ range previously suggested. A normalized distance quantization function, q, is also constructed, which remembers current point $p_x$ and sigma $\sigma$; for any x position it returns a quantization of the standard normal distance from $p_x$. For example, if $\sigma=4$, the quantization unit is $0.01\sigma$, $p_x$ is 200, and x is 205.367, then $x-p_x=5.367$, dividing by $\sigma$ yields 1.34175; and the quantization to the nearest $0.01\sigma$ yields 1.34. A function c is further defined to calculate the value multiplier in FIG. 25 for any quantized $\sigma$ range, and a function w to calculate the Gaussian weight value for any quantized $\sigma$ range. Using the observations that c' and w' are constant for any unique quantization range ($q(s_{begin})$, $q(s_{end})$), the c and w functions may be designed to read the values of c' and w' from a lookup table based on range; and to store a calculated value the first time that range is encountered. With that suite of functions, one can efficiently evaluate Equation 9 by summing the values for each function piece within the range of sections of interest.

Figure 26:
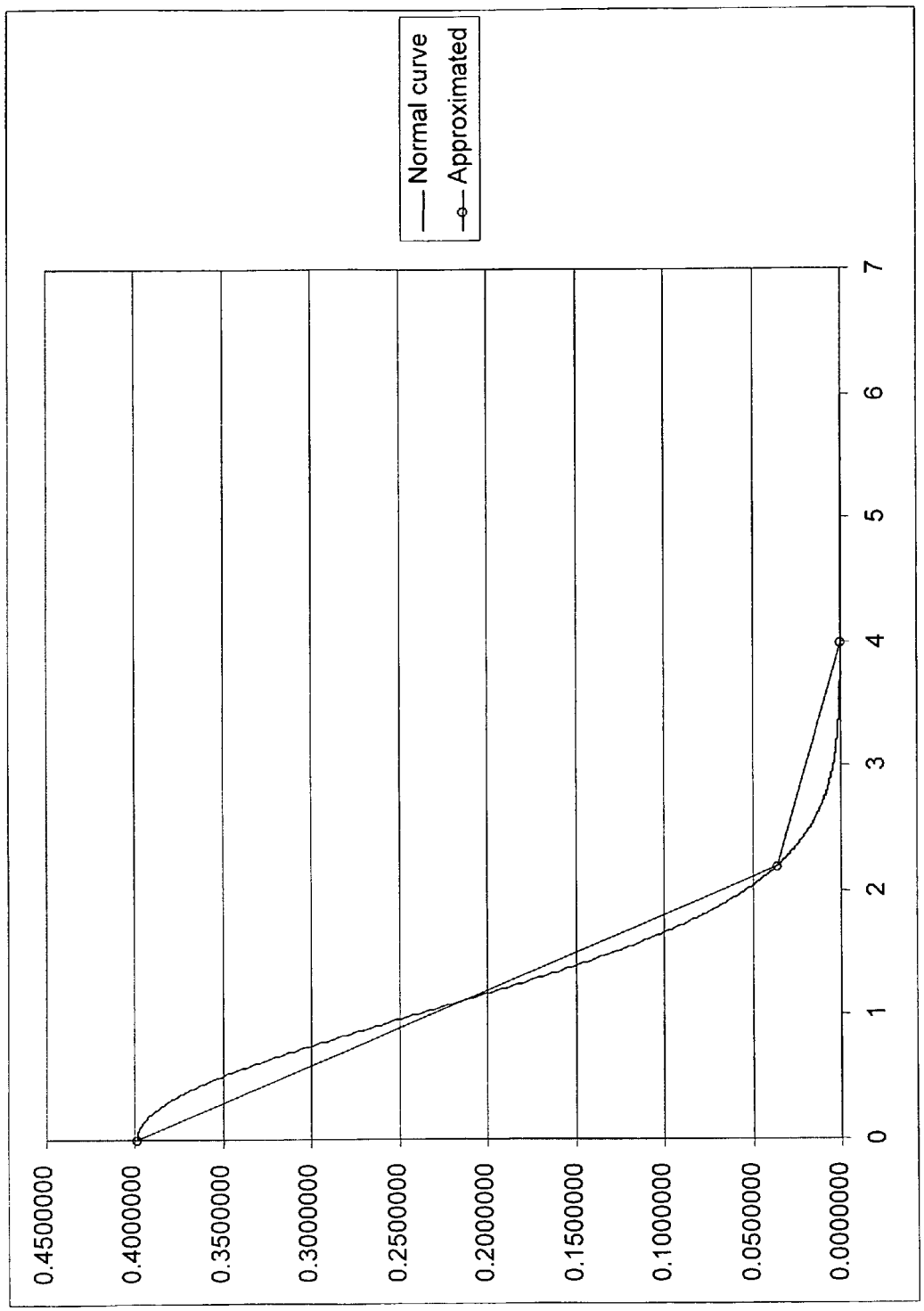
FIG. 26 shows an illustration of Gaussian weight approximation at sample, 2.2 sigma, and 4 sigma.

A2.2: Approximating the Gaussian Smoothed Function with Straight Line Components One embodiment retains data simplicity by using piecewise linear approximations to the Gaussian smoothing function. This embodiment is most efficient if the number of points at which Equation 9 is calculated is strictly limited. The Gaussian smoothing function's value can be approximated by evaluating only a few strategic locations near the critical shape points. It is shown in the Gaussian curve in FIG. 26 that the weighting function can be approximated with under 2% RMS error by simply evaluating Equation 9 at each critical shape point, plus the points at ±2.197σ offset, and at ±4σ offset from each such point. FIG. 26 illustrates the Gaussian weight curve, 2600, compared against a linear approximation 2602 in which samples are taken at 2.197σ and 4.0 σ. Calculating the sample point and the points at ±2.197σ offset, and at ±4σ offset from the sample requires one to generate no more than five approximations per original sample point.

This technique works well because the σ value is low relative to the original data's relative accuracy. That is, the <2% error one may incur in representing the Gaussian smoothing function, in which the σ value is merely three times the relative accuracy, is σ value of less than 0.06 times the relative accuracy. Thus, the incurred Gaussian representation error is far below the random noise caused by the shapes themselves.

For simplicity, when two sample points are less than double the 2.197σ apart, a single midpoint sample can be inserted between them; similarly, for samples less than 8σ apart, in addition to the ±2.197σ sample point insertions, insert a single midpoint sample to limit the effects of any data fluctuations outside the samples on the line between them.

Embodiments can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, execution environments/containers, and user applications.

Embodiments can include providing code for implementing processes. The providing can include providing code to a user in any manner. For example, the providing can include providing the code on a physical media to a user; or any other method of making the code available.

Embodiments can include a computer-implemented method for transmitting the code which can be executed at a computer to perform any of the processes of embodiments. The transmitting can include transfer through any portion of a network, such as the Internet; through wires; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of preferred embodiments has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for applying clothoid curve values to roadways in a geographic data information system, comprising:
    selecting database segments in the geographic data information system, wherein the database segments describe roadways;
    determining segment chains from the selected database segments, wherein determining the segment chains comprises:
        identifying a plurality of at grade junctions of the selected segments and all dead ends of the selected segments as important locations; and
        finding each geographic chain of segments that traverse from any such important location, and touch no other such important location, until reaching the same or other such important location;
    preparing the segment chains for transition to curvature space;
    transitioning to a curvature function in the curvature space, by computing heading change at points along the segment chains, resulting in a transformation of the segment chains into clothoids;
    smoothing the curvature function;
    fitting the smoothed curvature function with a more generalized form which remains within a selected tolerance of the smoothed curvature function; and
    storing parametric values of the smoothed curvature function for the segment chains in the geographic data information system;
    wherein the more generalized form of the smoothed curvature function is obtained by recursively applying a regression technique to said smoothed curvature function and seaming together the resulting plurality of regression-fit functions into a piecewise linear function, said seaming being achieved by assigning a common value to the more generalized form of the smoothed curvature function at the point where successive regression-fit functions are seamed together.

2. The method of claim 1, wherein preparing the segment chains for transition to curvature space further comprises finding corner interfaces.

3. The method of claim 2, wherein finding corner interfaces incorporates shape generalization to remove nearly collinear shape points.

4. The method of claim 2, wherein finding corner interfaces comprises:

using relative accuracy information to approximate a line attached to a curve defined by three successive shape points.

5. The method of claim 2, wherein preparing the segment chains for transition to curvature space further comprises:
generalization of shape points that have not been identified as part of a corner interface.

6. The method of claim 1, wherein preparing the segment chains for transition to curvature space comprises:
determination of each segment chain's geographic context.

7. The method of claim 1, wherein smoothing the curvature function comprises Gaussian smoothing.

8. The method of claim 1, wherein smoothing the curvature function comprises:
an approximation to Gaussian smoothing with a piecewise linear function connecting Gaussian sample points placed at intervals from shape points.

9. The method of claim 8, wherein the approximation to Gaussian smoothing is obtained from iterative samples stored in a table that associates Gaussian intervals with numeric parameters.

10. The method of claim 1, wherein the regression-fit functions are weighted least squares regression fit functions.

11. The method of claim 10, wherein fitting the smoothed curvature function further comprises:
applying a search for acceptable straight line substitutions to the piecewise linear fit function.

* * * * *